US012643815B2

(12) United States Patent
Hamada et al.

(10) Patent No.: US 12,643,815 B2
(45) Date of Patent: Jun. 2, 2026

(54) ALKALI-FREE GLASS

(71) Applicant: AGC Inc., Tokyo (JP)

(72) Inventors: Yuya Hamada, Chiyoda-ku (JP);
Hirofumi Tokunaga, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 239 days.

(21) Appl. No.: 18/594,084

(22) Filed: Mar. 4, 2024

(65) Prior Publication Data

US 2024/0199469 A1      Jun. 20, 2024

Related U.S. Application Data

(63) Continuation of application No. PCT/JP2022/032891, filed on Aug. 31, 2022.

(30) Foreign Application Priority Data

Sep. 7, 2021    (JP) ................................. 2021-145677

(51) Int. Cl.
| | |
|---|---|
| *B32B 15/04* | (2006.01) |
| *B32B 17/06* | (2006.01) |
| *C03B 18/02* | (2006.01) |
| *C03C 3/087* | (2006.01) |
| *C03C 3/091* | (2006.01) |
| *C03C 3/11* | (2006.01) |
| *C03C 3/112* | (2006.01) |
| *C03C 3/118* | (2006.01) |

(52) U.S. Cl.
CPC ............. *C03C 3/091* (2013.01); *C03B 18/02* (2013.01); *C03C 3/087* (2013.01); *C03C 3/11* (2013.01); *C03C 3/112* (2013.01); *C03C 3/118* (2013.01)

(58) Field of Classification Search
CPC ..................................................... C03C 3/091
USPC ................................................ 428/426, 410
See application file for complete search history.

(56) References Cited

U.S. PATENT DOCUMENTS

| | | | | |
|---|---|---|---|---|
| 6,537,937 B1 * | 3/2003 | Nishizawa | .............. | C03C 3/091 501/66 |
| 8,431,503 B2 * | 4/2013 | Nagai | ..................... | C03C 3/093 65/17.3 |
| 9,193,622 B2 * | 11/2015 | Tsujimura | ............... | C03C 3/087 |
| 2012/0149544 A1 * | 6/2012 | Nagai | ..................... | C03C 3/091 501/67 |
| 2019/0047899 A1 * | 2/2019 | Tokunaga | ............... | C03C 3/091 |
| 2020/0407264 A1 * | 12/2020 | Tokunaga | ............... | C03C 3/087 |
| 2020/0407265 A1 * | 12/2020 | Tokunaga | ............... | C03C 3/087 |
| 2021/0024403 A1 * | 1/2021 | Tokunaga | ............... | C03C 3/087 |
| 2021/0363051 A1 * | 11/2021 | Tokunaga | ................ | C03C 4/20 |
| 2021/0380466 A1 * | 12/2021 | Tokunaga | ................ | G11B 5/73 |
| 2021/0387897 A1 * | 12/2021 | Tokunaga | ............... | G11B 5/73 |
| 2022/0340477 A1 * | 10/2022 | Tokunaga | ............... | C03C 3/087 |
| 2026/0015281 A1 * | 1/2026 | Tokunaga | ............... | C03C 3/091 |

FOREIGN PATENT DOCUMENTS

| | | |
|---|---|---|
| CN | 104271526 A | 1/2015 |
| JP | 6578774 B2 | 9/2019 |
| WO | WO 2019/177069 A1 | 9/2019 |

* cited by examiner

*Primary Examiner* — Lauren R Colgan
(74) *Attorney, Agent, or Firm* — Oblon, McClelland, Maier & Neustadt, L.L.P.

(57) ABSTRACT

The present invention relates to an alkali-free glass having a strain point of 700° C. or higher and 740° C. or lower, a density of 2.6 g/cm³ or lower, a Young's modulus of 90 GPa or higher and 100 GPa or lower, an average coefficient of thermal expansion at 50° C. to 350° C. of $30 \times 10^{-7}$/K or higher and $39 \times 10^{-7}$/K or lower, a temperature $T_2$ at which a glass viscosity reaches $10^2$ dPa·s of 1590° C. or higher and 1690° C. or lower, a temperature $T_4$ at which the glass viscosity reaches $10^4$ dPa·s of 1350° C. or lower, a glass surface devitrification temperature ($T_c$) of lower than ($T_4$+ 80)° C., and a specific elastic modulus of 36 MN·m/kg or higher, and including a prescribed glass composition.

14 Claims, No Drawings

ALKALI-FREE GLASS

CROSS-REFERENCE TO RELATED APPLICATIONS

This is a continuation of International Application No. PCT/JP2022/032891 filed on Aug. 31, 2022, and claims priority from Japanese Patent Application No. 2021-145677 filed on Sep. 7, 2021, the entire content of which is incorporated herein by reference.

TECHNICAL FIELD

The present invention relates to an alkali-free glass suitable as a glass sheet or the like for various displays, photomasks, electronic device supports, information recording media, and the like.

BACKGROUND ART

In the related art, a glass to be used as a glass sheet for various displays, photomasks, electronic device supports, and information recording media, particularly a glass to be used as a glass sheet on which a thin film of metal, oxide, or the like is formed on a surface is required to have the following characteristics (1) to (4) and the like.

(1) When the glass contains an alkali metal oxide, alkali metal ions are diffused into the thin film to deteriorate film characteristics of the thin film, and thus, the glass contains substantially no alkali metal ions.

(2) The glass has a strain point high enough to minimize deformation of the glass sheet and shrinkage (thermal shrinkage) caused by structural stabilization of the glass when the glass sheet is exposed to high temperature in a step of forming the thin film.

(3) The glass has sufficient chemical durability against various chemicals used for forming a semiconductor. In particular, the glass has durability against buffered hydrofluoric acid (BHF: liquid mixture of hydrofluoric acid and ammonium fluoride) for etching $SiO_x$ and $SiN_x$, chemical liquid containing hydrochloric acid used for etching ITO, various acids (nitric acid, sulfuric acid, and the like) used for etching a metal electrode, alkali of resist stripping liquid, and the like.

(4) The glass has no defects (bubbles, striae, inclusions, pits, scratches, and the like) inside or on the surface.

In addition to the above requirements, the following requirements (5) to (9) have also been made in recent years.

(5) A display is required to be lightweight, and the glass itself is desired to have a small specific gravity.

(6) A display is required to be lightweight, and the glass sheet is desired to be made thinner.

(7) In addition to an amorphous silicon (a-Si) type liquid crystal display in the related art, a polycrystalline silicon (p-Si) type liquid crystal display, which requires a higher heat treatment temperature, is now being manufactured (heat resistance of a-Si: about 350° C., heat resistance of p-Si: 350° C. to 550° C.), and thus, heat resistance is desired.

(8) The glass with a small average coefficient of thermal expansion is required in order to increase productivity and thermal shock resistance by increasing a rate of temperature rise and fall in a heat treatment for manufacturing a liquid crystal display. On the other hand, in the case where the average coefficient of thermal expansion of the glass is too small, and the number of steps of forming various films such as a gate metal film and a gate insulating film increases in manufacturing the liquid crystal display, there are problems such as increased warpage of the glass, causing problems such as cracks and scratches during transportation of the liquid crystal display, and an increase in misalignment of an exposure pattern.

(9) In recent years, as glass sheets become larger and thinner, the glass is required to have a high specific elastic modulus (Young's modulus/density).

Furthermore, resolution has been made higher and higher in displays, and in a large-sized television, for example, a film thickness of Cu wiring has increased in accordance with higher definition, and for such a reason, warpage in a substrate tends to increase due to formation of various films. Therefore, to answer increasing needs for glass sheets with reduced warpage, it is necessary to increase a Young's modulus of a glass.

However, a glass having a high Young's modulus has a high strain point, and tends to have a high devitrification temperature as compared with a temperature $T_4$ at which a glass viscosity reaches $10^4$ dPa·s. As a result, the glass sheet is formed difficultly.

In order to solve the problems in the related art described above, the applicant of the present application proposes various glass compositions in glasses for liquid crystal display panels (see Patent Literatures 1 and 2), for example.

CITATION LIST

Patent Literature

Patent Literature 1: WO2019/177069
Patent Literature 2: JP6578774B

SUMMARY OF INVENTION

Technical Problem

In recent years, as a demand for higher definition displays becomes stronger, there is a need to further reduce a deflection by its own weight. Furthermore, as glass substrates become larger and thinner, the glass is required to have a high Young's modulus and a high specific elastic modulus (Young's modulus/density). Furthermore, in order to improve the thermal shock resistance of the glass, a coefficient of thermal expansion of the glass is required to be small.

In addition, due to requirements in a glass manufacturing process, it is required to lower a viscosity of the glass, particularly a temperature $T_2$ at which the glass viscosity reaches $10^2$ dPa·s and the temperature $T_4$ at which the glass viscosity reaches $10^4$ dPa·s, lower a glass surface devitrification temperature, and not to raise the strain point too much.

The glasses described in Patent Literatures 1 and 2 each have a low Young's modulus and a low specific elastic modulus, and thus, it is impossible to sufficiently reduce the deflection by its own weight, or have a high Young's modulus, a high specific elastic modulus, and a high average coefficient of thermal expansion, and thus, the glasses have low thermal shock resistance, making it difficult to satisfy these requirements.

An object of the present invention is to solve the drawbacks described above, and to provide a glass that can reduce a deflection by its own weight, and has excellent thermal shock resistance, excellent formability, and a low load on glass manufacturing facilities.

Solution to Problem

[1] An alkali-free glass having a strain point of 700° C. or higher and 740° C. or lower, a density of 2.6 g/cm³ or lower, a Young's modulus of 90 GPa or higher and 100 GPa or lower, an average coefficient of thermal expansion at 50° C. to 350° C. of $30 \times 10^7$/K or higher and $39 \times 10^{-7}$/K or lower, a temperature $T_2$ at which a glass viscosity reaches $10^2$ dPa·s of 1590° C. or higher and 1690° C. or lower, a temperature $T_4$ at which the glass viscosity reaches $10^4$ dPa·s of 1350° C. or lower, a glass surface devitrification temperature ($T_c$) of lower than $(T_4+80)$° C., and a specific elastic modulus of 36 MN·m/kg or higher, the alkali-free glass including:

as represented by mol % based on oxides, $SiO_2$: 55% or higher and 80% or lower;

$Al_2O_3$: 12% or higher and 20% or lower;

$B_2O_3$: 0.3% or higher and 5% or lower;

MgO: 5% or higher and 18% or lower;

CaO: 0.1% or higher and 12% or lower;

SrO: 0.1% or higher and 8% or lower; and

BaO: 0% or higher and 6% or lower, in which

MgO+CaO+SrO+BaO is 20% or lower,

MgO/CaO is 1 or higher,

MgO/(MgO+CaO+SrO+BaO) is 0.5 or higher,

MgO+$Al_2O_3$ is 24% or higher and 38% or lower, and when Formula (T) is $(-3.125 \times [SiO_2]-2.394 \times [Al_2O_3]-3.511 \times [B_2O_3]-2.167 \times [MgO]-2.608 \times [CaO]-3.161 \times [SrO]-3.583 \times [BaO]+3.795 \times 10^2)$, a value of Formula (I) is 90 or higher and 100 or lower.

[2] The alkali-free glass according to [1], in which when Formula (II) is $(0.213 \times [SiO_2]+1.006 \times [Al_2O_3]-0.493 \times [B_2O_3]+1.158 \times [MgO]+1.386 \times [CaO]+3.092 \times [SrO]+4.198 \times [BaO]+2.004 \times 10^2)$, a value of Formula (I)/Formula (II)×100 is 36 or higher.

[3] The alkali-free glass according to [1] or [2], in which (MgO+CaO)/(SrO+BaO) is 8 or higher.

[4] The alkali-free glass according to any one of [1] to [3], in which when an average coefficient of linear expansion at 50° C. to 350° C. is set as a, the Young's modulus is set as E, and a photoelastic constant is set as C, a product α·E·C is $9.2 \times 10^{-7}$/K or lower.

[5] The alkali-free glass according to any one of [1] to [4], having the photoelastic constant of 31 nm/MPa/cm or lower.

[6] The alkali-free glass according to any one of [1] to [5], having a glass transition point of 730° C. or higher and 850° C. or lower.

[7] The alkali-free glass according to any one of [1] to [6], having a glass surface devitrification viscosity of $10^{3.4}$ dPa·s or higher.

[8] The alkali-free glass according to any one of [1] to [7], including:

0% to 1% of $ZrO_2$ as represented by mol % based on oxides.

[9] The alkali-free glass according to any one of [1] to [8], in which a total amount of $Li_2O$, $Na_2O$, and $K_2O$ is 0.2% or lower as represented by mol % based on oxides.

[10] The alkali-free glass according to any one of [1] to [9], including:

0% or higher and 0.5% or lower of $SnO_2$ as represented by mol % based on oxides.

[11] The alkali-free glass according to any one of [1] to [10], including:

0% or higher and 1% or lower of F as represented by mol % based on oxides.

[12] The alkali-free glass according to any one of [1] to [11], having a β-OH value of the glass of 0.05 mm$^{-1}$ or higher and 0.6 mm$^{-1}$ or lower.

[13] A glass sheet, in which the glass sheet includes the alkali-free glass according to any one of [1] to [12], and has at least one side of 2400 mm or longer and a thickness of 1 mm or less.

[14] A method for manufacturing the alkali-free glass according to any one of [1] to [12], the method including:

forming the alkali-free glass by a float process or a fusion process.

Advantageous Effects of Invention

According to the present invention, a glass that can reduce a deflection by its own weight, and has excellent thermal shock resistance, excellent formability, and a low load on glass manufacturing facilities can be provided.

DESCRIPTION OF EMBODIMENTS

Hereinafter, an alkali-free glass according to an embodiment of the present invention will be described.

In the following, a composition range of each component of the glass is represented by mol % based on oxides.

The alkali-free glass according to the present embodiment includes 55% or higher and 80% or lower of $SiO_2$.

When a content of $SiO_2$ is lower than 55 mol % (hereinafter, simply referred to as %), a strain point tends not to increase sufficiently, an average coefficient of thermal expansion tends to increase, and a density tends to increase. Therefore, the content of $SiO_2$ is 55% or higher, preferably 58% or higher, more preferably 60% or higher, further preferably 61% or higher, particularly preferably 62% or higher, and most preferably 63% or higher.

When the content of $SiO_2$ is higher than 80%, meltability of the glass tends to decrease, a Young's modulus tends to decrease, and a glass surface devitrification temperature ($T_c$) tends to increase. Therefore, the content of $SiO_2$ is 80% or lower, preferably 75% or lower, more preferably 73% or lower, further preferably 70% or lower, particularly preferably 69% or lower, and most preferably 68% or lower.

The alkali-free glass according to the present embodiment includes 12% or higher and 20% or lower of $Al_2O_3$. $Al_2O_3$ increases the Young's modulus to inhibit a deflection, inhibits phase separation of the glass, and improves a fracture toughness value to increase glass strength.

When a content of $Al_2O_3$ is lower than 12%, those effects do not appear easily. In addition, other components increasing the average coefficient of thermal expansion increase relatively, and as a result, the average coefficient of thermal expansion tends to increase. Therefore, the content of $Al_2O_3$ is 12% or higher, preferably 12.3% or higher, more preferably 12.6% or higher, further preferably 13% or higher, even more preferably 13.3% or higher, particularly preferably 13.6% or higher, and most preferably 14% or higher.

When the content of $Al_2O_3$ is higher than 20%, the meltability of the glass may deteriorate, the strain point may increase, and the glass surface devitrification temperature ($T_c$) may increase. Therefore, the content of $Al_2O_3$ is 20% or lower, preferably 18% or lower, more preferably 17.5% or lower, further preferably 17% or lower, even more preferably 16.5% or lower, particularly preferably 16% or lower, and most preferably 15.5% or lower.

The alkali-free glass according to the present embodiment includes 0.3% or higher and 5% or lower of $B_2O_3$. $B_2O_3$ improves buffered hydrofluoric acid (liquid mixture of hydrofluoric acid and ammonium fluoride, sometimes referred to as BHF) resistance, improves a melting reaction of the glass, and decreases the glass surface devitrification temperature ($T_c$), and thus, a content of $B_2O_3$ may be 5% or lower. The content of $B_2O_3$ is preferably 4% or lower, more preferably 3.5% or lower, further preferably 3% or lower, particularly preferably 2.5% or lower, and most preferably 2% or lower.

When the content of $B_2O_3$ is lower than 0.3%, those effects do not appear easily. Therefore, the content of $B_2O_3$ is 0.3% or higher, preferably 0.5% or higher, more preferably 0.6% or higher, further preferably 0.7% or higher, particularly preferably 0.8% or higher, and most preferably 0.9% or higher.

The alkali-free glass according to the present embodiment includes 5% or higher and 18% or lower of MgO. MgO increases the Young's modulus without increasing the density, and thus, MgO is capable of increasing the specific elastic modulus to thereby inhibit a deflection by its own weight, and improves the fracture toughness value to increase the glass strength. MgO also improves the meltability.

When a content of MgO is lower than 5%, those effects do not appear easily, and a coefficient of thermal expansion may be too low. Therefore, the content of MgO is 5% or higher. The content of MgO is preferably 7% or higher, more preferably 9% or higher, further preferably 10% or higher, particularly preferably 10.5% or higher, and most preferably 11% or higher.

However, when the content of MgO is too high, the glass surface devitrification temperature ($T_c$) tends to increase. Therefore, the content of MgO is 18% or lower, preferably 17.5% or lower, more preferably 17% or lower, further preferably 16.5% or lower, particularly preferably 16.3% or lower, and most preferably 16% or lower.

The alkali-free glass according to the present embodiment includes 0.1% or higher and 12% or lower of CaO. CaO has a characteristic of increasing the specific elastic modulus next to MgO among alkaline earth metals and not excessively lowering the strain point, and improves the meltability similarly to MgO. Further, CaO has a characteristic that the glass surface devitrification temperature ($T_c$) is less likely to be increased as compared with MgO. When a content of CaO is lower than 0.1%, those effects do not appear easily. Therefore, the content of CaO is 0.1% or higher. The content of CaO is preferably 0.5% or higher, more preferably 1% or higher, further preferably 1.5% or higher, particularly preferably 2% or higher, and most preferably 2.5% or higher.

When the content of CaO is higher than 12%, the average coefficient of thermal expansion becomes too high, and the glass surface devitrification temperature ($T_c$) increases to devitrify the glass easily during the manufacture of the glass. Therefore, the content of CaO is 12% or lower, preferably 10% or lower, more preferably 9% or lower, further preferably 8.5% or lower, particularly preferably 8% or lower, and most preferably 7.5% or lower.

The alkali-free glass according to the present embodiment includes 0.1% or higher and 8% or lower of SrO. SrO does not increase the glass surface devitrification temperature ($T_c$) and improves meltability, but when a content of SrO is lower than 0.1%, those effects do not appear easily. Therefore, the content of SrO is 0.1% or higher, preferably 0.15% or higher, more preferably 0.2% or higher, further preferably 0.3% or higher, and particularly preferably 0.4% or higher.

The effects described above in SrO are lower than those in BaO, and when the content of SrO is higher than 8%, an effect of increasing the density surpasses those effects, and the average coefficient of thermal expansion may also increase excessively. Therefore, the content of SrO is 8% or lower, preferably 6% or lower, more preferably 5% or lower, further preferably 4% or lower, particularly preferably 3% or lower, and most preferably 2% or lower.

The alkali-free glass according to the present embodiment includes 0% or higher and 6% or lower of BaO. BaO improves the meltability without increasing the glass surface devitrification temperature ($T_c$), and thus, BaO may be included. When BaO is included, a content of BaO is preferably 0.1% or higher, more preferably 0.3% or higher, further preferably 0.5% or higher, particularly preferably 0.8% or higher, and most preferably 1% or higher.

When the content of BaO is large, the density tends to increase, the Young's modulus tends to decrease, and the average coefficient of thermal expansion tends to increase too much. Therefore, the content of BaO is 6% or lower, preferably 5.5% or lower, more preferably 5% or lower, particularly preferably 4.5% or lower, and most preferably 4% or lower.

When considering toxicity of Ba, it is preferable that BaO is substantially not included. The phrase "substantially not included" means that a component is not included except for inevitable impurities, and in the present embodiment, the content of BaO is, for example, lower than 0.1%, preferably 0.05% or lower, and more preferably 0.01% or lower.

When a total content of alkaline earth metal oxides, that is, MgO+CaO+SrO+BaO is too large, the average coefficient of thermal expansion may not be able to be reduced. Acid resistance may deteriorate. Therefore, MgO+CaO+SrO+BaO is 20% or lower, preferably 19.8% or lower, more preferably 19.6% or lower, further preferably 19.4% or lower, particularly preferably 19.2% or lower, and most preferably 19.1% or lower.

When the glass surface devitrification temperature ($T_c$) is low, the glass surface devitrification viscosity becomes high and the formability improves. In order to lower the glass surface devitrification temperature ($T_c$), MgO+CaO+SrO+BaO is preferably 10% or higher, more preferably 12% or higher, further preferably 13% or higher, even more preferably 14% or higher, particularly preferably 15% or higher, and most preferably 16% or higher. Here, MgO+CaO+SrO+BaO is, for example, 10% or higher and 20% or lower.

When a blending proportion (MgO/CaO) of MgO and CaO is small, devitrification of a $CaO$—$Al_2O_3$—$SiO_2$ system tends to occur, resulting in deteriorating the formability. Specifically, the devitrification temperature increases and the glass surface devitrification viscosity decreases. Therefore, MgO/CaO is set to 1 or higher. MgO/CaO is preferably 1.1 or higher, more preferably 1.2 or higher, further preferably 1.3 or higher, particularly preferably 1.5 or higher, and most preferably 1.8 or higher.

On the other hand, when MgO/CaO is too large, the devitrification of the $MgO$—$Al_2O_3$—$SiO_2$ system tends to occur, the glass surface devitrification temperature increases, and the glass surface devitrification viscosity decreases. Therefore, MgO/CaO is preferably 100 or lower, more preferably 30 or lower, further preferably 15 or lower, particularly preferably 10 or lower, and most preferably 5 or lower. Here, MgO/CaO is, for example, 1 or higher and 100 or lower.

When a blending proportion of MgO to the total amount of the alkaline earth metal oxides (MgO+CaO+SrO+BaO), that is, MgO/(MgO+CaO+SrO+BaO) is small, the density increases and the specific elastic modulus decreases. The phase separation characteristics and the acid resistance of the glass deteriorate. Therefore, MgO/(MgO+CaO+SrO+BaO) is set to 0.5 or higher. MgO/(MgO+CaO+SrO+BaO) is preferably 0.52 or higher, more preferably 0.54 or higher, further preferably 0.56 or higher, particularly preferably 0.58 or higher, and most preferably 0.6 or higher.

On the other hand, in order to prevent the occurrence of devitrification in the MgO—Al$_2$O$_3$—SiO$_2$ system and to inhibit the increase in the devitrification temperature, MgO/(MgO+CaO+SrO+BaO) is preferably 0.95 or lower, more preferably 0.9 or lower, further preferably 0.85 or lower, and particularly preferably 0.8 or lower. Here, MgO/(MgO+CaO+SrO+BaO) is, for example, 0.5 or higher and 0.95 or lower.

A total amount of MgO and Al$_2$O$_3$, that is, MgO+Al$_2$O$_3$ is 24% or higher and 38% or lower.

When MgO+Al$_2$O$_3$ is lower than 24%, the Young's modulus becomes low and the deformation of a substrate in response to external stress becomes large. Therefore, MgO+Al$_2$O$_3$ is set to 24% or higher. MgO+Al$_2$O$_3$ is preferably 24.2% or higher, more preferably 24.5% or higher, further preferably 25% or higher, particularly preferably 25.5% or higher, and most preferably 26% or higher.

On the other hand, when MgO+Al$_2$O$_3$ is higher than 38%, the devitrification temperature increases and the formability deteriorates. Therefore, MgO+Al$_2$O$_3$ is set to 38% or lower. MgO+Al$_2$O$_3$ is preferably 35% or lower, more preferably 33% or lower, further preferably 32% or lower, particularly preferably 31% or lower, and most preferably 30% or lower.

In the alkali-free glass according to the present embodiment, when a blending proportion of a total amount of MgO and CaO to a total amount of SrO and BaO, that is, (MgO+CaO)/(SrO+BaO) is 8 or higher, the Young's modulus can be improved while inhibiting an increase in the density, and thus, the specific elastic modulus can be increased, which is preferable. (MgO+CaO)/(SrO+BaO) is more preferably 10 or higher, further preferably 12 or higher, even more preferably 14 or higher, particularly preferably 16 or higher, and most preferably 18 or higher.

On the other hand, when (MgO+CaO)/(SrO+BaO) is preferably 200 or lower, the devitrification temperature can be inhibited from increasing, which is preferable. (MgO+CaO)/(SrO+BaO) is preferably 100 or lower, more preferably 75 or lower, further preferably 60 or lower, and particularly preferably 50 or lower. Here, (MgO+CaO)/(SrO+BaO) is, for example, 8 or higher and 200 or lower.

In the alkali-free glass according to the present embodiment, when Formula (I) is (−3.125×[SiO$_2$]−2.394×[Al$_2$O$_3$]−3.511×[B$_2$O$_3$]−2.167×[MgO]−2.608×[CaO]−3.161×[SrO]−3.583×[BaO]+3.795×10$^2$), a value of Formula (I) is 90 or higher and 100 or lower.

The value represented by Formula (I) is an index of the Young's modulus, and when the value is lower than 90, the Young's modulus tends to be low, the specific elastic modulus tends to decrease, and the deflection by its own weight tends to increase. When the value is higher than 100, the Young's modulus becomes too large and a cutting margin is impaired. The value represented by Formula (I) is preferably 90.5 or higher and 97 or lower, more preferably 90.8 or higher and 95 or lower, further preferably 91 or higher and 94 or lower, particularly preferably 91.2 or higher and 93.5 or lower, and most preferably 91.5 or higher and 93 or lower.

The description of [metal oxide] (for example, [SiO$_2$]) in the formula represents a numerical value when a metal oxide component is expressed in mol % (the same applies to descriptions in other parts of the present specification). For example, when SiO$_2$ is 60 mol % as represented by mol % based on oxides, [SiO$_2$] represents 60.

In the alkali-free glass according to the present embodiment, when Formula (II) is (0.213×[SiO$_2$]+1.006×[Al$_2$O$_3$]−0.493×[B$_2$O$_3$]+1.158×[MgO]+1.386×[CaO]+3.092×[SrO]+4.198×[BaO]+2.004×10$^2$), a value of Formula (I)/Formula (II)×100 is preferably 36 or higher.

The value represented by Formula (I)/Formula (II)×100 is an index of the specific elastic modulus. When the value represented by Formula (I)/Formula (II)×100 is preferably 36 or higher, the specific elastic modulus becomes high, which is preferable. The value of Formula (I)/Formula (II)×100 is more preferably 36.1 or higher, further preferably 36.2 or higher, even more preferably 36.3 or higher, particularly preferably 36.4 or higher, and most preferably 36.5 or higher.

The value of Formula (I)/Formula (II)×100 is preferably 50 or lower because the cutting margin can be maintained. Here, the value of Formula (I)/Formula (II)×100 is, for example, 36 or higher and 50 or lower.

A value represented by Formula (II) is an index of the density, and the value is preferably 260 or lower because the density becomes low. When the value represented by Formula (II) is lower than 240, the density may become too low. Therefore, the value represented by Formula (II) is preferably 240 or higher.

The value represented by Formula (II) is more preferably 242 or higher and 259 or lower, further preferably 244 or higher and 258 or lower, even more preferably 246 or higher and 257 or lower, particularly preferably 248 or higher and 256 or lower, and most preferably 250 or higher and 255 or lower.

The alkali-free glass according to the present embodiment preferably substantially does not include an alkali metal oxide such as Li$_2$O, Na$_2$O, or K$_2$O. In the present embodiment, the phrase "substantially does not include an alkali metal oxide" means that the alkali metal oxide is not included except for inevitable impurities mixed from raw materials and the like, that is, the alkali metal oxide is not intentionally included. For example, the content is 0.1% or lower, preferably 0.08% or lower, more preferably 0.05% or lower, and further preferably 0.03% or lower.

However, a predetermined amount of alkali metal oxides may be included to obtain specific effects (lowering the strain point, lowering Tg, lowering an annealing point, and the like). Specifically, a total amount of Li$_2$O, Na$_2$O, and K$_2$O may be 0.2% or lower. The total content is more preferably 0.15% or lower, more preferably 0.1% or lower, more preferably 0.08% or lower, further preferably 0.05% or lower, and most preferably 0.03% or lower. The total amount of Li$_2$O, Na$_2$O, and K$_2$O may be 0.001% or higher. Here, the total amount of Li$_2$O, Na$_2$O, and K$_2$O is, for example, 0.001% or higher and 0.2% or lower.

When the alkali-free glass according to the present embodiment is used for a glass sheet for a display, it is preferable that the alkali-free glass according to the present embodiment substantially does not include P$_2$O$_5$ in order to avoid deterioration of the characteristics of the thin film of metal, oxide, or the like provided on the surface of the glass sheet. In the present embodiment, the phrase "substantially does not include P$_2$O$_5$" means, for example, a content of 0.1% or lower. Furthermore, in order to facilitate recycling of the glass and from a viewpoint of environmental load, it is preferable that the alkali-free glass according to the present embodiment substantially does not include PbO, $As_2O_3$, and $Sb_2O_3$. In the present embodiment, the phrase "substantially does not include PbO, $As_2O_3$, and $Sb_2O_3$" means that a content of PbO, $As_2O_3$, and $Sb_2O_3$ is, for example, 0.01% or lower, and preferably 0.005% or lower.

On the other hand, in order to improve the meltability, refining property, the formability, and the like of the glass, one or more of $As_2O_3$ and $Sb_2O_3$ may be included in a total amount of 1% or lower, preferably 0.5% or lower, more preferably 0.3% or lower, further preferably 0.2% or lower, particularly preferably 0.15% or lower, and most preferably 0.1% or lower.

In order to improve the meltability, the refining property, the formability, and the like of the glass, the alkali-free glass according to the present embodiment may include one or more of $ZrO_2$, ZnO, $Fe_2O_3$, $SO_3$, F, Cl, and $SnO_2$ in a total amount of 2% or lower. The content is preferably 1% or lower, and more preferably 0.5% or lower.

The alkali-free glass according to the present embodiment may include $ZrO_2$ in a content of, for example, 0.001% or higher in order to lower a glass melting temperature, increase the Young's modulus, and improve chemical resistance.

However, when a content of $ZrO_2$ is too large, the glass surface devitrification temperature may become high, a dielectric constant $\varepsilon$ may become high, and the glass may become non-uniform. When the glass is applied to a semiconductor device, there is a risk of failure due to $\alpha$ rays. Therefore, the content of $ZrO_2$ is preferably 1% or lower, more preferably 0.5% or lower, further preferably 0.2% or lower, even more preferably 0.1% or lower, still more preferably 0.05% or lower, yet still more preferably 0.04% or lower, particularly preferably 0.03% or lower, and most preferably substantially not included. The phrase "$ZrO_2$ is substantially not included" means that $ZrO_2$ is not included except for inevitable impurities mixed from raw materials and the like, that is, $ZrO_2$ is not intentionally included. In the present embodiment, the phrase "$ZrO_2$ is substantially not included" means that the content of $ZrO_2$ is, for example, 0.01% or lower, and preferably 0.005% or lower.

In order to improve the meltability and the refining property of the glass, the alkali-free glass according to the present embodiment may include 0% or higher and 0.5% or lower of $SnO_2$. The content of $SnO_2$ is preferably 0.4% or lower, and more preferably 0.3% or lower.

The alkali-free glass according to the present embodiment may include F in order to improve the meltability and the refining property of the glass. When F is included, a content of F is preferably 1% or lower, more preferably 0.5% or lower, further preferably 0.4%, even more preferably 0.3% or lower, still more preferably 0.2% or lower, and particularly preferably 0.1% or lower as represented by mol %. The content of F is not an amount added to a glass raw material, but an amount remaining in a molten glass. Regarding this point, the same applies to a content of Cl which will be described later.

The alkali-free glass according to the present embodiment may include Fe in a content of 0.001% or higher and 0.05% or lower in terms of $Fe_2O_3$ in order to improve the meltability of the glass. When the content of Fe in the glass is lowered, an amount of infrared rays absorbed by $Fe^{2+}$ during a step of melting is reduced, resulting in an increase in a thermal conductivity of the glass. Accordingly, when the glass is heated and melted with heat rays from, for example, a burner flame in a glass melting furnace, a temperature distribution of the molten glass is reduced, a convection velocity of the molten glass decreases, and a foam quality or homogeneity of a glass product may deteriorate. When the content of Fe is 0.001% or higher in terms of $Fe_2O_3$, there is little possibility that the above problem will occur. The refining property or homogeneity depends on sufficient convection of the molten glass.

When it is desired to improve the meltability of the glass, the content of Fe is more preferably 0.002% or higher, further preferably 0.005% or higher, even more preferably 0.008% or higher, still more preferably 0.01% or higher, yet still more preferably 0.02% or higher, particularly preferably 0.03% or higher, and most preferably 0.04% or higher in terms of $Fe_2O_3$.

When the content of Fe in the glass increases, Fe exists as $Fe^{2+}$ or $Fe^{3+}$ in the glass, and a transmittance of the glass may decrease. In particular, since $Fe^{3+}$ has absorption in a range of wavelength of 300 nm or lower, there is a risk that an ultraviolet transmittance of the glass may be decreased. For example, in the case of glass sheets for various displays, the transmittance at a wavelength of 300 nm is preferably 20% or higher with a sheet thickness of 0.5 mm because two glass substrates constituting a flat panel display can be bonded together using photocurable resin. In order to obtain a glass having the transmittance of 20% at the wavelength of 300 nm or higher with the sheet thickness of 0.5 mm, the content of Fe is preferably 0.05% or lower, more preferably 0.04% or lower, further preferably 0.03% or lower, even more preferably 0.02% or lower, still more preferably 0.01% or lower, yet still more preferably 0.008% or lower, further more preferably 0.006% or lower, particularly preferably 0.004% or lower, and most preferably 0.002% or lower in terms of $Fe_2O_3$.

In order to improve the refining property of the glass, Cl may be included in a content of 0.1% or higher and 1.0% or lower as represented by mol %. When the content of Cl is 0.1% or higher, a clarifying action during melting of the glass raw material will be excellent. The content of Cl is preferably 0.15% or higher, more preferably 0.2% or higher, further preferably 0.25% or higher, and particularly preferably 0.3% or higher.

When the content of Cl is 1.0% or lower, an action of inhibiting enlargement of a bubble layer when manufacturing the glass is excellent. The content is preferably 0.8% or lower, and more preferably 0.6% or lower.

For objects such as improving the meltability, the refining property, the formability, and the like, obtaining absorption at a specific wavelength, and improving the density, hardness, bending rigidity, durability, and the like, the alkali-free glass according to the present embodiment may include one or more of $Se_2O_3$, $TeO_2$, $Ga_2O_3$, $In_2O_3$, $GeO_2$, CdO, BeO, and $Bi_2O_3$ in a total amount of 2% or lower, preferably 1% or lower, more preferably 0.5% or lower, further preferably 0.3% or lower, further preferably 0.1% or lower, particularly preferably 0.05% or lower, and most preferably 0.01% or lower. A content of $GeO_2$ is preferably lower than 0.1%, more preferably 0.08% or lower, further preferably 0.05% or lower, even more preferably 0.03% or lower, particularly preferably 0.01% or lower, and most preferably substantially not included. The phrase "$GeO_2$ is substantially not included" means that $GeO_2$ is not included except for inevitable impurities mixed from raw materials and the like, that is, $GeO_2$ is not intentionally included. In the present embodiment, the phrase "$GeO_2$ is substantially not included" means that the content of $GeO_2$ is, for example, 0.05% or lower, preferably 0.01% or lower, and more preferably 0.005% or lower.

The alkali-free glass according to the present embodiment may include a rare earth oxide or a transition metal oxide in order to improve the meltability, the refining property, the formability, and the like of the glass and to improve the hardness of the glass such as the Young's modulus.

The alkali-free glass according to the present embodiment may include, as the rare earth oxide, one or more of $Sc_2O_3$, $Y_2O_3$, $La_2O_3$, $Ce_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$ in a total amount of 2% or lower, preferably 1% or lower, more preferably 0.5% or lower, further preferably 0.3% or lower, even more preferably 0.1% or lower, particularly preferably 0.05% or lower, and most preferably 0.01% or lower. A content of $La_2O_3$ is preferably lower than 1%, more preferably 0.5% or lower, further preferably 0.3% or lower, even more preferably 0.1% or lower, particularly preferably 0.05% or lower, and most preferably substantially not included. The phrase "$La_2O_3$ is substantially not included" means that $La_2O_3$ is not included except for inevitable impurities mixed from raw materials and the like, that is, $La_2O_3$ is not intentionally included. In the present embodiment, the phrase "$La_2O_3$ is substantially not included" means that the content of $La_2O_3$ is, for example, lower than 0.05%, preferably 0.01% or lower, and more preferably 0.005% or lower.

The alkali-free glass according to the present embodiment may include, as the transition metal oxide, one or more of $V_2O_5$, $Ta_2O_3$, $Nb_2O_5$, $WO_3$, $MoO_3$, and $HfO_2$ in a total amount of 2% or lower, preferably 1% or lower, more preferably 0.5% or lower, further preferably 0.3% or lower, even more preferably 0.1% or lower, particularly preferably 0.05% or lower, and most preferably 0.01% or lower.

In order to improve the meltability and the like of the glass, the alkali-free glass according to the present embodiment may include $ThO_2$, which is an actinide oxide, in a content of 2% or lower, preferably 1% or lower, more preferably 0.5% or lower, further preferably 0.3% or lower, even more preferably 0.1% or lower, still more preferably 0.05% or lower, particularly preferably 0.01% or lower, and most preferably 0.005% or lower.

The alkali-free glass according to the present embodiment preferably has a β-OH value of 0.05 $mm^{-1}$ or higher and 0.6 $mm^{-1}$ or lower because thermal shrinkage of the glass can be inhibited.

The β-OH value is an index of a content of moisture in the glass, and is obtained by measuring an absorbance of a glass sample with respect to light having a wavelength of 2.75 μm to 2.95 μm, and dividing a maximum value $\alpha_{max}$ of the absorbance by a thickness (mm) of the sample. The β-OH value of the glass is more preferably 0.45 $mm^{-1}$ or lower, further preferably 0.4 $mm^{-1}$ or lower, even more preferably 0.35 $mm^{-1}$ or lower, still more preferably 0.3 $mm^{-1}$ or lower, yet still more 0.28 $mm^{-1}$ or lower, particularly preferably 0.25 $mm^{-1}$ or lower, and most preferably 0.23 $mm^{-1}$ or lower. On the other hand, when the β-OH value is 0.05 $mm^{-1}$ or higher, it is easy to achieve the strain point of glass described below. Therefore, the β-OH value is more preferably 0.08 $mm^{-1}$ or higher, further preferably 0.1 $mm^{-1}$ or higher, even more preferably 0.13 $mm^{-1}$ or higher, still more preferably 0.15 $mm^{-1}$ or higher, particularly preferably 0.18 $mm^{-1}$ or higher, and most preferably 0.2 $mm^1$ or higher.

The alkali-free glass according to the present embodiment has a strain point of 700° C. or higher and 740° C. or lower. When the strain point is lower than 700° C., deformation of the glass sheet and shrinkage (thermal shrinkage) caused by structural stabilization of the glass are likely to occur when the glass sheet is exposed to high temperature in a step of forming a thin film of the display. The strain point is preferably 705° C. or higher, more preferably 710° C. or higher, further preferably 715° C. or higher, particularly preferably 720° C. or higher, and most preferably 725° C. or higher.

On the other hand, when the strain point is too high, it is necessary to increase a temperature of an annealing device in accordance with the strain point, and the life of the annealing device tends to be reduced. Therefore, the strain point is 740° C. or lower. The strain point is preferably 738° C. or lower, more preferably 736° C. or lower, and further preferably 735° C. or lower.

The alkali-free glass according to the present embodiment has a density of 2.6 $g/cm^3$ or lower. When the density is 2.6 $g/cm^3$ or lower, the deflection by its own weight becomes small, and it becomes easier to handle a large-sized substrate. A weight of a device using the glass can be reduced. The density is preferably 2.59 $g/cm^3$ or lower, more preferably 2.58 $g/cm^3$ or lower, further preferably 2.57 $g/cm^3$ or lower, particularly preferably 2.56 $g/cm^3$ or lower, and most preferably 2.55 $g/cm^3$ or lower. The large-sized substrate is, for example, a substrate with at least one side of 1800 mm or longer.

On the other hand, the density is preferably 2.4 $g/cm^3$ or higher because stability during transportation is improved. The density is more preferably 2.42 $g/cm^3$ or higher, further preferably 2.44 $g/cm^3$ or higher, even more preferably 2.46 $g/cm^3$ or higher, particularly preferably 2.48 $g/cm^3$ or higher, and most preferably 2.5 $g/cm^3$ or higher. Here, the density is, for example, 2.4 $g/cm^3$ or higher and 2.6 $g/cm^3$ or lower.

The Young's modulus of the alkali-free glass according to the present embodiment may be 90 GPa or higher and 100 GPa or lower. When the Young's modulus is 90 GPa or higher, the deformation of the substrate due to external stress is inhibited. For example, when a film is formed on the surface of a glass substrate, the substrate can be inhibited from warping. As a specific example, in manufacturing of a TFT-side substrate of a flat panel display, warpage of the substrate is inhibited when a gate metal film of copper or the like and a gate insulating film of silicon nitride or the like are formed on the surface of the substrate. The deflection when the size of the substrate increases is also inhibited, for example. The Young's modulus is preferably 90.5 GPa or higher, more preferably 91 GPa or higher, further preferably 91.2 GPa or higher, particularly preferably 91.5 GPa or higher, and most preferably 92 GPa or higher.

When the Young's modulus is 100 GPa or lower, the cutting margin becomes large. The Young's modulus is preferably 98 GPa or lower, more preferably 97 GPa or lower, further preferably 96 GPa or lower, and most preferably 95 GPa or lower. The Young's modulus can be measured by an ultrasonic method.

The alkali-free glass according to the present embodiment has an average coefficient of thermal expansion at 50° C. to 350° C. of $30 \times 10^{-7}$/K or higher. When the average coefficient of thermal expansion is lower than $30 \times 10^{-7}$/K, for example, in the manufacture of the TFT-side substrate of the flat panel display, the gate metal film of copper or the like and the gate insulating film of silicon nitride or the like may be laminated sequentially on the alkali-free glass, and a difference in thermal expansion between the glass and the gate metal film of copper or the like formed on the surface of the substrate increases so that there may arise such a problem that the substrate is warped or the film is peeled off.

The average coefficient of thermal expansion at 50° C. to 350° C. is preferably $30.5 \times 10^{-7}$/K or higher, more preferably $31 \times 10^{-7}$/K or higher, further preferably $31.5 \times 10^{-7}$/K or higher, particularly preferably $32\times10^{-7}$/K or higher, and most preferably $32.5\times10^{-7}$/K or higher.

On the other hand, when the average coefficient of thermal expansion at 50° C. to 350° C. is higher than $39\times10^{-7}$/K, the glass may be cracked in a step of manufacturing a product such as a display, and thermal shock resistance of the glass is decreased. Therefore, the average coefficient of thermal expansion at 50° C. to 350° C. is $39\times10^{-7}$/K or lower. The average coefficient of thermal expansion at 50° C. to 350° C. is preferably $38.5\times10^{-7}$/K or lower, more preferably $38\times10^{-7}$/K or lower, further preferably $37.5\times10^{-7}$/K or lower, particularly preferably $37.3\times10^{-7}$/K or lower, and most preferably $37\times10^{-7}$/K or lower. Here, the average coefficient of thermal expansion at 50° C. to 350° C. is, for example, $30\times10^{-7}$/K or higher and $39\times10^{-7}$/K or lower.

In the alkali-free glass according to the present embodiment, a temperature $T_2$ at which a glass viscosity n reaches $10^2$ dPa·s (temperature at which log $\eta=2$) is 1590° C. or higher and 1690° C. or lower. When $T_2$ is 1590° C. or higher, $SO_3$ can be used as a refining agent in a step of manufacturing the glass. $T_2$ is preferably 1592° C. or higher, more preferably 1594° C. or higher, further preferably 1596° C. or higher, particularly preferably 1598° C. or higher, and most preferably 1600° C. or higher.

On the other hand, when $T_2$ is 1690° C. or lower, the meltability of the glass is excellent. Therefore, a load on manufacturing facilities can be reduced. For example, a life of facilities such as a furnace for melting glass can be extended, and the productivity can be improved. In addition, defects (for example, crack defects and Zr defects) derived from the furnace can be reduced. $T_2$ is preferably 1670° C. or lower, more preferably 1660° C. or lower, further preferably 1650° C. or lower, even more preferably 1640° C. or lower, and most preferably 1635° C. or lower.

In the alkali-free glass according to the present embodiment, a temperature $T_4$ at which a glass viscosity $\eta$ reaches $10^4$ dPa·s (temperature at which log $\eta=4$) is 1350° C. or lower. When $T_4$ is 1350° C. or lower, the formability of the glass is excellent. In addition, for example, by lowering the temperature at the time of forming the glass, it is possible to reduce an amount of volatile matter in an atmosphere around the glass to thereby reduce the defects of the glass. Since the glass can be formed at a low temperature, the load on manufacturing facilities can be reduced. For example, the life of facilities such as a float bath for forming the glass can be extended, and the productivity can be improved. $T_4$ is preferably 1340° C. or lower, more preferably 1330° C. or lower, further preferably 1320° C. or lower, even more preferably 1310° C. or lower, particularly preferably 1300° C. or lower, and most preferably 1295° C. or lower.

A lower limit of $T_4$ is not particularly limited, and is generally 1100° C. or higher. $T_4$ is, for example, 1100° C. or higher and 1350° C. or lower.

Regarding $T_2$ and $T_4$, the viscosity is measured by using a rotary viscometer according to a method specified under ASTM C 965-96, and a temperature at which the viscosity reaches $10^2$ dPa·s can be determined as $T_2$, and temperature at which the viscosity reaches $10^4$ dPa·s can be determined as $T_4$. In Examples to be described later, NBS 710 and NIST 717a were used as reference samples for device calibration.

The alkali-free glass according to the present embodiment has the glass surface devitrification temperature ($T_c$) of lower than $(T_4+80)°$ C. When $T_c$ is lower than $(T_4+80)°$ C., the formability of the glass is excellent. The transmittance can be inhibited from decreasing due to crystals generated inside the glass during forming. In addition, a load on manufacturing facilities can be reduced. For example, the life of facilities such as a float bath for forming the glass can be extended, and the productivity can be improved.

$T_c$ is preferably $(T_4+75)°$ C. or lower, more preferably $(T_4+70)°$ C. or lower, further preferably $(T_4+60)°$ C. or lower, even more preferably $(T_4+50)°$ C. or lower, particularly preferably $(T_4+40)°$ C. or lower, and most preferably $(T_4+30)°$ C. or lower.

A lower limit of $T_c$ is not particularly limited, and is generally 1000° C. or higher. $T_c$ is, for example, 1000° C. or higher and lower than $(T_4+80)°$ C.

The glass surface devitrification temperature ($T_c$) in the present embodiment can be determined as follows. That is, pulverized glass particles are placed into a dish made of platinum, a heat treatment is performed for 17 hours in an electric furnace controlled at a constant temperature, a maximum temperature at which crystals are precipitated on the surface of the glass and a minimum temperature at which crystals are not precipitated are observed using an optical microscope after the heat treatment, and an average value thereof is defined as the glass surface devitrification temperature ($T_c$).

The alkali-free glass according to the present embodiment preferably has a viscosity (glass surface devitrification viscosity ($\eta_c$)) at the glass surface devitrification temperature ($T_c$) of $10^{3.4}$ dPa·s or higher. When the glass surface devitrification viscosity ($\eta_c$) is $10^{3.4}$ dPa·s or higher, the formability of the glass sheet is excellent. In addition, the transmittance can be inhibited from decreasing due to crystals generated inside the glass during forming. In addition, a load on manufacturing facilities can be reduced. For example, the life of facilities such as a float bath for forming the glass sheet can be extended, and the productivity can be improved. $\eta_c$ is more preferably $10^{3.5}$ dPa·s or higher, further preferably $10^{3.6}$ dPa·s or higher, particularly preferably $10^{3.7}$ dPa·s or higher, and most preferably $10^{3.8}$ dPa·s or higher.

An upper limit of $\eta_c$ is not particularly limited, and is generally $10^6$ dPa·s or lower. $\eta_c$ is, for example, $10^{3.4}$ dPa·s or higher and $10^6$ dPa·s or lower.

The alkali-free glass according to the present embodiment has a specific elastic modulus (Young's modulus (GPa)/density (g/cm$^3$)) of 36 MN·m/kg or higher. When the specific elastic modulus is 36 MN·m/kg or higher, the deflection by its own weight becomes small, and it becomes easier to handle the large-sized substrate. The specific elastic modulus is preferably 36.1 MN·m/kg or higher, more preferably 36.2 MN·m/kg or higher, further preferably 36.3 MN·m/kg or higher, particularly preferably 36.4 MN·m/kg or higher, and most preferably 36.5 MN·m/kg or higher.

An upper limit of the specific elastic modulus is not particularly limited, and is generally 50 MN·m/kg or lower. The specific elastic modulus is, for example, 36 MN·m/kg or higher and 50 MN·m/kg or lower.

The large-sized substrate is, for example, a substrate with at least one side of 1800 mm or longer. At least one side of the large-sized substrate may be, for example, 2000 mm or longer, 2500 mm or longer, 3000 mm or longer, or 3500 mm or longer.

The alkali-free glass according to the present embodiment preferably has a glass transition point (hereinafter, also referred to as Tg) of 850° C. or lower. When Tg is 850° C. or lower, the load on manufacturing facilities can be reduced. For example, a surface temperature of a roll used for forming the glass can be lowered, and the life of facilities can be extended, and the productivity can be improved. Tg is more preferably 830° C. or lower, more preferably 820° C. or lower, further preferably 810° C. or lower, and particularly preferably 800° C. or lower. From a viewpoint of heat resistance, Tg is preferably 730° C. or higher. Tg is more preferably 740° C. or higher, further preferably 750° C. or higher, particularly preferably 760° C. or higher, and most preferably 770° C. or higher. Here, Tg is preferably 730° C. or higher and 850° C. or lower.

The alkali-free glass according to the present embodiment preferably has a photoelastic constant of 31 nm/MPa/cm or lower.

The stress generated in a step of manufacturing a liquid crystal display panel or during use of a liquid crystal display device may cause the glass substrate to have birefringence, causing black display to turn gray and reducing a contrast of the liquid crystal display. This phenomenon can be inhibited when the photoelastic constant is 31 nm/MPa/cm or lower. The photoelastic constant is more preferably 30 nm/MPa/cm or lower, further preferably 29 nm/MPa/cm or lower, even more preferably 28 nm/MPa/cm or lower, particularly preferably 27.5 nm/MPa/cm or lower, and most preferably 27 nm/MPa/cm or lower.

Considering the ease of securing other physical properties, the photoelastic constant is preferably 23 nm/MPa/cm or higher, and more preferably 25 nm/MPa/cm or higher. The photoelastic constant can be measured at a measurement wavelength of 546 nm by a disk compression method. Here, the photoelastic constant is preferably 23 nm/MPa/cm or higher and 31 nm/MPa/cm or lower.

In a case where the alkali-free glass according to the present embodiment is used as a glass sheet for a liquid crystal display, when the average coefficient of linear expansion at 50° C. to 350° C. is set as $\alpha$, the Young's modulus is set as E, and the photoelastic constant is set as C, a product $\alpha \cdot E \cdot C$ of $\alpha$, E, and C is preferably $9.2 \times 10^7$/K or lower.

In the liquid crystal display, heat from backlight causes uneven temperature distribution on the glass sheet (array glass sheet in TFT-LCD) closer to the backlight. When the difference between the maximum temperature and the minimum temperature within the glass sheet is set as $\Delta T$, a maximum value F of the stress generated within the glass sheet is expressed by the following Formula.

$$F = \alpha \cdot E \cdot \Delta T$$

An optical path difference, that is, a retardation R generated in the glass sheet having a thickness L due to the stress F is expressed by the following Formula.

$$R = C \cdot F \cdot L = (\alpha \cdot E \cdot C) \cdot \Delta T \cdot L$$

Therefore, the smaller $\alpha \cdot E \cdot C$ is, the smaller R is, and the better the contrast of the liquid crystal display becomes.

When $\alpha \cdot E \cdot C$ is $9.2 \times 10^{-7}$/K or lower, in the case where the alkali-free glass according to the present embodiment is used as the glass sheet for a liquid crystal display, the contrast of the liquid crystal display is excellent and contrast defects are less likely to occur.

$\alpha \cdot E \cdot C$ is more preferably $9 \times 10^{-7}$/K or lower, further preferably $8.8 \times 10^{-7}$/K or lower, even more preferably $8.7 \times 10^{-7}$/K or lower, particularly preferably $8.6 \times 10^{-7}$/K or lower, and most preferably $8.5 \times 10^{-7}$/K or lower.

A lower limit of $\alpha \cdot E \cdot C$ is not particularly limited, and is generally $5 \times 10^{-7}$/K or higher. $\alpha \cdot E \cdot C$ is preferably $5 \times 10^{-7}$/K or higher and $9.2 \times 10^{-7}$/K or lower.

Since the alkali-free glass according to the present embodiment has a high Young's modulus of 90 GPa or higher and a high specific elastic modulus of 36 MN·m/kg or higher, the deflection by its own weight can be reduced. Therefore, it is suitable for the glass sheet used as the large-sized substrate. The large-sized substrate is preferably a glass sheet with at least one side of 1800 mm or longer, and specifically a glass sheet with a long side of 1800 mm or longer and a short side of 1500 mm or longer.

The alkali-free glass according to the present embodiment is more preferably a glass sheet with at least one side of 2400 mm or longer, for example, a glass sheet with a long side of 2400 mm or longer and a short side of 2100 mm or longer, further preferably a glass sheet with at least one side of 3000 mm or longer, for example, a glass sheet with a long side of 3000 mm or longer and a short side of 2800 mm or longer, particularly preferable a glass sheet with at least one side of 3200 mm or longer, for example, a glass sheet with a long side of 3200 mm or longer and a short side of 2900 mm or longer, and most preferable a glass sheet with at least one side of 3300 mm or longer, for example, a glass sheet with a long side of 3300 mm or longer and a short side of 2950 mm or longer.

The glass sheet according to the present embodiment preferably has a thickness of 1 mm or less because the weight can be reduced. The thickness of the glass sheet according to the present embodiment is more preferably 0.7 mm or less, further preferably 0.65 mm or less, even more preferably 0.55 mm or less, particularly preferably 0.45 mm or less, and most preferably 0.4 mm or less. The glass sheet according to the present embodiment can also have a thickness of 0.1 mm or less, or 0.05 mm or less. However, from a viewpoint of inhibiting the deflection by its own weight, the thickness is preferably 0.1 mm or more, and more preferably 0.2 mm or more. The thickness of the glass sheet is preferably 0.1 mm or longer and 1 mm or lower.

The alkali-free glass according to the present embodiment can be, for example, manufactured by the following procedure.

Raw materials for the above components are blended to have a target content in a glass composition, thrown into a melting furnace, and heated to 1500° C. to 1800° C. to be melted, and a molten glass is obtained. The obtained molten glass is formed into a glass ribbon with a predetermined sheet thickness by a forming device, the glass ribbon is annealed, and then cut, and the alkali-free glass is obtained.

In the present embodiment, it is preferable that the molten glass is formed into a glass sheet by a float process, a fusion process, or the like. The float process is preferred from a viewpoint of stably producing a large-sized glass sheet (for example, having one side of 1800 mm or longer) with a high Young's modulus.

EXAMPLES

Examples will be described below, and the present invention is not limited to these examples. In the following, Examples 1 to 14 and 24 to 55 are working examples, and Examples 15 to 23 are comparative examples.

Raw materials of the respective components were blended so that the glass composition became a target composition (unit: mol %) shown in Examples 1 to 55, and melted in a platinum crucible at 1600° C. for 1 hour. After melting, molten liquid was poured onto a carbon sheet, held at a temperature of (glass transition point+30° C.) for 60 minutes, and cooled to a room temperature (25° C.) at a rate of 1° C. per minute to obtain a sheet-shaped glass. The sheet-shaped glass was mirror-finished to obtain a glass sheet, and various evaluations were performed. The β-OH value of the glass was obtained by the following procedure.

(β-OH Value)

The β-OH value was obtained by measuring an absorbance of a glass sample with respect to light having a wavelength of 2.75 μm to 2.95 μm, and dividing a maximum value $\beta_{max}$ of the absorbance by a thickness (mm) of the sample.

Results are shown in Tables 1 to 8. Values shown in parentheses in Tables 1 to 8 are calculated values.

Methods for measuring the respective physical properties are shown below.

(Average Coefficient of Thermal Expansion α)

Measurement was performed by use of a differential thermal expansion meter (dilatometer) according to a method specified under JIS R3102 (1995). A measuring temperature range was set as a range from room temperature to 400° C. or higher, and an average coefficient of thermal expansion at 50° C. to 350° C. was expressed by a unit of $10^{-7}$/K.

(Density)

The density of about 20 g of a glass block including no bubbles was measured by an Archimedes method according to a method specified under JIS Z 8807.

(Strain Point)

The strain point was measured by a fiber drawing method according to a method specified under JIS R3103-2 (2001).

(Tg)

Tg was measured by a thermal expansion method according to a method specified under JIS R3103-3 (2001).

(Young's Modulus)

The Young's modulus was measured for a glass with a thickness of 0.5 mm to 10 mm by an ultrasonic pulse method according to a method specified under JIS Z 2280.

($T_2$)

The viscosity was measured by use of a rotary viscometer, and the temperature $T_2$ (° C.) at which the viscosity reached $10^2$ dPa·s was measured according to a method specified under ASTM C 965-96.

($T_4$)

The viscosity was measured by use of a rotary viscometer, and the temperature $T_4$ (° C.) at which the viscosity reached $10^4$ dPa·s was measured according to a method specified under ASTM C 965-96.

(Glass Surface Devitrification Temperature $T_c$)

The glass was crushed and classified into a particle size range of 2 mm to 4 mm by using testing sieves. The obtained glass cullet was ultrasonically cleaned in isopropyl alcohol for 5 minutes, washed with ion-exchanged water, then dried, put into a dish made of platinum, and subjected to a heat treatment for 17 hours in an electric furnace controlled to a fixed temperature. The temperature of the heat treatment was set at an interval of 10° C.

After the heat treatment, the glass was extracted from the platinum dish, the maximum temperature at which crystals were precipitated on the surface of the glass and the minimum temperature at which no crystals were precipitated likewise were measured by using an optical microscope.

Each of the maximum temperature at which the crystals were precipitated on the surface of the glass and the minimum temperature at which no crystals were precipitated was measured once. (Or the measurement was performed twice when precipitation of crystals was determined difficultly.)

An average value of the maximum temperature at which the crystals were precipitated on the surface of the glass and the minimum temperature at which no crystals were precipitated was obtained and regarded as the glass surface devitrification temperature ($T_c$).

In the following tables, $T_c$–$T_4$ was shown in order to easily recognize the relationship that $T_c$ is lower than ($T_4$+ 80)° C.

(Glass Surface Devitrification Viscosity $\eta_c$)

The glass surface devitrification temperature ($T_c$) was obtained in the method described above, and the viscosity of the glass at the glass surface devitrification temperature ($T_c$) was measured and regarded as the glass surface devitrification viscosity ($\eta_c$). In the following tables, a logarithm value (log value) of the glass surface devitrification viscosity ($\eta_c$) was shown.

(Specific Elastic Modulus)

The Young's modulus obtained in the procedure described above was divided by the density to obtain the specific elastic modulus.

(Photoelastic Constant)

The photoelastic constant was measured at a measurement wavelength of 546 nm by the disk compression method.

(BHF Haze)

When a haze change before and after immersing the glass sheet in a 19BHF solution at 25° C. for 20 minutes was 1% or lower, the BHF haze was expressed as ○ (Good), and when the haze change was higher than 1%, the BHF haze was expressed as x (Poor).

TABLE 1

| (mol %) | Example 1 | Example 2 | Example 3 | Example 4 | Example 5 | Example 6 |
|---|---|---|---|---|---|---|
| $SiO_2$ | 66.0 | 64.2 | 66.2 | 66.0 | 66.2 | 66.3 |
| $Al_2O_3$ | 14.0 | 15.4 | 14.1 | 13.4 | 13.5 | 13.5 |
| $B_2O_3$ | 0.9 | 1.9 | 1.1 | 1.2 | 1.2 | 1.2 |
| MgO | 12.1 | 12.5 | 14.6 | 11.5 | 11.5 | 11.5 |
| CaO | 6.6 | 5.5 | 3.1 | 7.4 | 16.4 | 5.7 |
| SrO | 0.4 | 0.5 | 0.9 | 0.5 | 1.2 | 1.8 |
| BaO | 0 | 0 | 0 | 0 | 0 | 0 |
| $Li_2O$ | 0 | 0 | 0 | 0 | 0 | 0 |
| $Na_2O$ | 0.01 | 0.01 | 0.01 | 0.01 | 0.01 | 0.01 |
| $K_2O$ | 0 | 0 | 0 | 0 | 0 | 0 |
| F | 0 | 0 | 0 | 0 | 0 | 0 |
| β-OH ($mm^{-1}$) | (0.25) | (0.25) | (0.25) | (0.25) | (0.25) | (0.25) |
| MgO + CaO + SrO + BaO | 19.1 | 18.5 | 18.6 | 19.4 | 19.1 | 19.0 |
| MgO/(MgO + CaO + SrO + BaO) | 0.63 | 0.68 | 0.78 | 0.59 | 0.60 | 0.61 |
| (MgO + CaO)/(SrO) + BaO) | 46.8 | 36.0 | 19.7 | 37.5 | 14.9 | 9.5 |
| MgO/CaO | 1.8 | 2.3 | 4.7 | 1.6 | 1.8 | 2.0 |
| MgO + $Al_2O_3$ | 26.1 | 27.9 | 28.7 | 24.9 | 25.0 | 25.0 |
| Value of Formula (I) | 91.9 | 92.3 | 92.4 | 91.2 | 90.7 | 90.3 |
| Value of Formula (II) | 252 | 252 | 252 | 252 | 253 | 254 |

TABLE 1-continued

| (mol %) | Example 1 | Example 2 | Example 3 | Example 4 | Example 5 | Example 6 |
|---|---|---|---|---|---|---|
| Formula (I)/Formula (II) × 100 | 36.4 | 36.6 | 36.7 | 36.1 | 35.8 | 35.5 |
| Average coefficient of thermal expansion α (×10⁻⁷/K.) | 36 | 36 | 36 | 37 | 36 | 37 |
| Density (g/cm³) | 2.52 | 2.53 | 2.52 | 2.53 | 2.53 | 2.54 |
| Strain point (° C.) | 734 | 729 | 731 | (721) | (722) | (722) |
| Tg (° C.) | 789 | 786 | 787 | 779 | 789 | 787 |
| Young's modulus E (GPa) | 92 | 92 | 93 | 91 | 93 | 92 |
| $T_2$ [logη = 2] (° C.) | 1634 | 1599 | 1630 | 1624 | 1628 | 1634 |
| $T_4$ [logη = 4] (° C.) | 1290 | 1270 | 1289 | 1286 | 1288 | 1293 |
| Surface devitrification temperature $T_c$ (° C.) | 1295 | 1340 | 1360 | 1295 | 1305 | 1305 |
| $T_C - T_4$ (° C.) | 5 | 70 | 71 | 9 | 17 | 12 |
| log (surface devitrification viscosity $η_c$ (dPa · s)) | 4.0 | 3.4 | 3.5 | 3.9 | 3.9 | 3.9 |
| Specific elastic modulus (MN · m/kg) | 36.5 | 36.4 | 36.7 | 36.1 | 36.7 | 36.1 |
| Photoelastic constant C (nm/MPa/cm) | (25.3) | (24.9) | (25.3) | (25.8) | (25.9) | (26.0) |
| α · E · C (×10⁻⁷/K) | (8.5) | (8.2) | (8.3) | (8.8) | (8.8) | (8.7) |
| BIIF haze | ○ | ○ | ○ | ○ | ○ | ○ |

TABLE 2

| (mol %) | Example 7 | Example 8 | Example 9 | Example 10 | Example 11 | Example 12 |
|---|---|---|---|---|---|---|
| $SiO_2$ | 66.0 | 64.3 | 68.0 | 69.0 | 68.5 | 66.0 |
| $Al_2O_3$ | 14.3 | 15.2 | 13.0 | 13.0 | 14.0 | 14.7 |
| $B_2O_3$ | 2.0 | 0.7 | 1.0 | 1.0 | 1.0 | 1.0 |
| MgO | 13.5 | 10.5 | 12.5 | 13.0 | 14.5 | 13.0 |
| CaO | 3.2 | 8.3 | 4.5 | 3.0 | 1.0 | 4.3 |
| SrO | 1.0 | 1.0 | 1.0 | 1.0 | 1.0 | 1.0 |
| BaO | 0 | 0 | 0 | 0 | 0 | 0 |
| $Li_2O$ | 0 | 0 | 0 | 0 | 0 | 0 |
| $Na_2O$ | 0.01 | 0.01 | 0.01 | 0.01 | 0.01 | 0.01 |
| $K_2O$ | 0 | 0 | 0 | 0 | 0 | 0 |
| F | 0 | 0 | 0 | 0 | 0 | 0 |
| β-OH (mm⁻¹) | (0.25) | (0.25) | (0.25) | (0.25) | (0.25) | (0.25) |
| MgO + CaO + SrO + BaO | 17.7 | 19.8 | 18.0 | 17.0 | 16.5 | 18.3 |
| MgO/(MgO + CaO + SrO + BaO) | 0.76 | 0.53 | 0.69 | 0.76 | 0.88 | 0.71 |
| (MgO + CaO)/(SrO) + BaO) | 16.7 | 18.8 | 17.0 | 16.0 | 15.5 | 17.3 |
| MgO/CaO | 4.2 | 1.3 | 2.8 | 4.3 | 14.5 | 3.0 |
| MgO + $Al_2O_3$ | 27.8 | 25.7 | 25.5 | 26.0 | 28.5 | 27.7 |
| Value of Formula (I) | 91.2 | 92.2 | 90.4 | 90.1 | 91.2 | 92.0 |
| Value of Formula (II) | 251 | 256 | 251 | 250 | 250 | 253 |
| Formula (I)/Formula (II) × 100 | 36.3 | 36.0 | 36.0 | 36.0 | 36.5 | 36.4 |
| Average coefficient of thermal expansion α (×10⁻⁷/K.) | 34 (34) | 39 | 35 | 35 | 30 | 35 (35) |
| Density (g/cm³) | 2.51 (2.51) | 2.56 | 2.51 | 2.49 | 2.49 | 2.52 (2.53) |
| Strain point (° C.) | 726 (725) | 738 | 731 | 733 | 740 | 733 (735) |
| Tg (° C.) | 786 (779) | 791 | 786 | 787 | 791 | 796 (795) |
| Young's modulus E (GPa) | 91 (90) | 92 | 91 | 91 | 92 | 92 (93) |
| $T_2$ [logη = 2] (° C.) | 1625 (1633) | 1604 | 1664 | 1684 | 1666 | 1630 (1632) |
| $T_4$ [logη = 4] (° C.) | 1280 (1289) | 1273 | 1307 | 1322 | 1312 | 1290 (1283) |
| Surface devitrification temperature $T_c$ (° C.) | 1335 (1336) | 1285 | 1325 (1318) | 1355 | (1362) | (1330) |
| $T_C - T_4$ (° C.) | 55 (47) | 12 | 18 (11) | 33 | (50) | (47) |
| log (surface devitrification viscosity $η_c$ (dPa · s)) | 3.6 (3.6) | 3.9 | 3.9 (3.9) | 3.7 | (3.6) | (3.7) |
| Specific elastic modulus (MN · m/kg) | 36.4 (36.0) | 36.1 | 36.1 | 36.4 | 36.9 | 36.5 (36.6) |
| Photoelastic constant C (nm/MPa/cm) | (25.9) | (24.4) | (26.5) | (26.8) | (26.1) | (25.2) |
| α · E · C (×10⁻⁷/K) | (8.0) | (8.7) | (8.3) | (8.5) | (7.1) | (8.2) |
| BIIF haze | ○ | ○ | ○ | ○ | ○ | ○ |

TABLE 3

| (mol %) | Example 13 | Example 14 | Example 15 | Example 16 | Example 17 | Example 18 |
|---|---|---|---|---|---|---|
| $SiO_2$ | 65.5 | 67.2 | 68.6 | 63.5 | 64.3 | 67.1 |
| $Al_2O_3$ | 15.5 | 14.3 | 12.7 | 15.5 | 15.5 | 11.6 |

TABLE 3-continued

| (mol %) | Example 13 | Example 14 | Example 15 | Example 16 | Example 17 | Example 18 |
|---|---|---|---|---|---|---|
| $B_2O_3$ | 1.0 | 2.0 | 0.3 | 3.3 | 0 | 0 |
| MgO | 13.0 | 14.0 | 11.4 | 7.5 | 15.7 | 13.1 |
| CaO | 3.0 | 1.5 | 4.1 | 5.9 | 4.5 | 8.3 |
| SrO | 2.0 | 1.0 | 2.7 | 4.3 | 0 | 0 |
| BaO | 0 | 0 | 0.3 | 0 | 0 | 0 |
| $Li_2O$ | 0 | 0 | 0 | 0 | 0 | 0 |
| $Na_2O$ | 0.01 | 0.01 | 0.01 | 0 | 0.03 | 0 |
| $K_2O$ | 0 | 0 | 0 | 0 | 0 | 0 |
| F | 0 | 0 | 0 | 0 | 0.08 | 0 |
| $\beta$-OH (mm$^{-1}$) | (0.25) | (0.25) | (0.2) | — | 0.25 | — |
| MgO + CaO + SrO + BaO | 18.0 | 16.5 | 18.5 | 17.7 | 20.2 | 21.4 |
| MgO/(MgO + CaO + SrO + BaO) | 0.72 | 0.85 | 0.62 | 0.42 | 0.78 | 0.61 |
| (MgO + CaO)/(SrO) + BaO) | 8.0 | 15.5 | 5.2 | 3.1 | — | — |
| MgO/CaO | 4.3 | 9.3 | 2.8 | 1.3 | 3.5 | 1.6 |
| MgO + $Al_2O_3$ | 28.5 | 28.3 | 24.1 | 23.0 | 31.2 | 24.6 |
| Value of Formula (I) | 91.9 | 90.8 | 88.7 | 87.1 | 95.7 | 92.3 |
| Value of Formula (II) | 255 | 249 | 256 | 258 | 254 | 253 |
| Formula (I)/Formula (II) × 100 | 36.1 | 36.4 | 34.6 | 33.8 | 37.7 | 36.5 |
| Average coefficient of thermal expansion $\alpha$ (×10$^{-7}$/K.) | 35 (35) | 32 (32) | (36.6) | (39.6) | (35.0) | (39.0) |
| Density (g/cm$^3$) | 2.55 | 2.49 | (2.56) | (2.57) | 2.55 | 2.53 |
| Strain point (° C.) | 736 | 731 | (737) | (705) | (744) | (726) |
| Tg (° C.) | 797 (790) | 787 (785) | (791) | (766) | (797) | 783 |
| Young's modulus E (GPa) | 93 | 91 | (89) | (85) | 95 | 91 |
| $T_2$ [log$\eta$ = 2] (° C.) | 1643 | 1622 | (1671) | (1623) | (1589) | (1612) |
| $T_4$ [log$\eta$ = 4] (° C.) | 1297 | 1286 | (1316) | (1280) | (1268) | (1265) |
| Surface devitrification temperature $T_c$ (° C.) | 1355 (1336) | 1365 (1357) | — | (≤1315) | (>1288) | (1345) |
| $T_C$ − $T_4$ (° C.) | 58 (39) | 79 (71) | | ≤35 | (>20) | (80) |
| log (surface devitrification viscosity $\eta_c$ (dPa · s)) | 3.6 (3.7) | 3.4 (3.5) | — | — | (<3.8) | (<3.4) |
| Specific elastic modulus (MN · m/kg) | 36.5 | 36.6 | (34.8) | (33.1) | 37.4 | 36.1 |
| Photoelastic constant C (nm/MPa/cm) | (24.8) | (26.3) | (26.0) | (27.0) | (25.3) | (25.7) |
| $\alpha$ · E · C (×10$^{-7}$/K) | (8.0) | (7.6) | (8.5) | (9.1) | (8.4) | (9.2) |
| BIIF haze | ○ | ○ | — | — | (x) | (x) |

35

TABLE 4

| (mol %) | Example 19 | Example 20 | Example 21 | Example 22 | Example 23 |
|---|---|---|---|---|---|
| $SiO_2$ | 65.0 | 68.5 | 62.4 | 64.4 | 65.2 |
| $Al_2O_3$ | 12.8 | 13.8 | 16.0 | 13.8 | 13.5 |
| $B_2O_3$ | 0.5 | 0.2 | 0.7 | 1.6 | 1.2 |
| MgO | 11.0 | 12.8 | 11.0 | 13.0 | 9.2 |
| CaO | 9.7 | 4.1 | 8.8 | 1.6 | 9.7 |
| SrO | 1.0 | 0.7 | 1.0 | 5.6 | 1.2 |
| BaO | 0 | 0 | 0 | 0 | 0 |
| $Li_2O$ | 0 | 0 | 0 | 0 | 0 |
| $Na_2O$ | 0 | 0 | 0.08 | 0 | 0 |
| $K_2O$ | 0 | 0 | 0 | 0 | 0 |
| F | 0 | 0 | 0.13 | 0 | 0 |
| $\beta$-OH (mm$^{-1}$) | — | — | 0.32 | — | — |
| MgO + CaO + SrO + BaO | 21.7 | 17.6 | 20.8 | 20.2 | 20.1 |
| MgO/(MgO + CaO + SrO + BaO) | 0.51 | 0.73 | 0.53 | 0.64 | 0.46 |
| (MgO + CaO)/(SrO + BaO) | 20.7 | 24.1 | 19.8 | 2.6 | 15.8 |
| MgO/CaO | 1.1 | 3.1 | 1.3 | 8.1 | 0.9 |
| MgO + $Al_2O_3$ | 23.8 | 26.6 | 27.0 | 26.8 | 22.7 |
| Value of Formula (I) | 91.7 | 91.1 | 93.8 | 89.5 | 90.2 |
| Value of Formula (II) | 256 | 251 | 257 | 262 | 255 |
| Formula (I)/Formula (II) × 100 | 35.8 | 36.2 | 36.4 | 34.2 | 35.4 |
| Average coefficient of thermal expansion $\alpha$ (×10$^{-7}$/K) | (40.9) | (35.4) | 39.7 | (38.5) | 39.6 |
| Density (g/cm$^3$) | (2.56) | (2.51) | (2.57) | (2.61) | 2.55 |
| Strain point (° C.) | (714) | (722) | (715) | (725) | 712 |
| Tg (° C.) | (770) | (807) | (773) | (788) | 768 |
| Young's modulus E (GPa) | (92) | (88) | (93) | (88) | 92 |
| $T_2$ [log$\eta$ = 2] (° C.) | (1603) | (1663) | (1577) | (1615) | 1616 |
| $T_4$ [log$\eta$ = 4] (° C.) | (1266) | (1317) | (1255) | (1270) | 1279 |
| Surface devitrification temperature $T_c$ (° C.) | (≤1286) | — | (≤1275) | — | 1275 |
| $T_C$ − $T_4$ (° C.) | (≤20) | — | (≤20) | — | −4 |
| log (surface devitrification | (≥3.8) | — | (≥3.8) | — | 4.0 |

TABLE 4-continued

| (mol %) | Example 19 | Example 20 | Example 21 | Example 22 | Example 23 |
|---|---|---|---|---|---|
| viscosity $\eta_c$ (dPa · s)) | | | | | |
| Specific elastic modulus (MN · m/kg) | (35.8) | (35.1) | (36.2) | (33.7) | 36.0 |
| Photoelastic constant C (nm/MPa/cm) | (25.1) | (25.0) | (24.5) | (25.9) | (25.7) |
| $\alpha \cdot E \cdot C$ ($\times 10^{-7}$/K) | (9.4) | (7.8) | (9.0) | (8.8) | (9.4) |
| BHF haze | — | (×) | — | — | — |

TABLE 5

| (mol %) | Example 24 | Example 25 | Example 26 | Example 27 | Example 28 | Example 29 | Example 30 | Example 31 |
|---|---|---|---|---|---|---|---|---|
| $SiO_2$ | 66.0 | 66.0 | 66.0 | 66.0 | 65.9 | 63.3 | 65.9 | 66.0 |
| $Al_2O_3$ | 14.0 | 14.0 | 14.0 | 13.4 | 14.0 | 14.7 | 14.0 | 14.0 |
| $B_2O_3$ | 0.9 | 0.9 | 0.9 | 1.2 | 0.9 | 2.0 | 0.9 | 0.9 |
| MgO | 12.1 | 11.5 | 12.1 | 11.5 | 12.1 | 13.5 | 12.1 | 12.1 |
| CaO | 6.0 | 6.6 | 6.6 | 7.4 | 6.6 | 5.2 | 6.6 | 6.6 |
| SrO | 1.0 | 1.0 | 0.4 | 0.5 | 0.4 | 0.8 | 0.4 | 0.4 |
| BaO | 0 | 0 | 0 | 0 | 0 | 0.5 | 0 | 0 |
| $Li_2O$ | 0 | 0 | 0 | 0 | 0 | 0 | 0.05 | 0 |
| $Na_2O$ | 0.01 | 0.01 | 0.01 | 0.01 | 0.01 | 0.05 | 0.05 | 0.05 |
| $K_2O$ | 0 | 0 | 0 | 0 | 0 | 0 | 0.05 | 0 |
| $SnO_2$ | 0 | 0 | 0 | 0 | 0 | 0 | 0 | 0 |
| $ZrO_2$ | 0 | 0 | 0 | 0 | 0 | 0 | 0 | 0 |
| $Fe_2O_3$ | 0.010 | 0.012 | 0.008 | 0.011 | 0.007 | 0.015 | 0.008 | 0.008 |
| Cl | 0 | 0 | 0 | 0 | 0 | 0 | 0 | 0 |
| F | 0 | 0 | 0.05 | 0.05 | 0.1 | 0 | 0 | 0 |
| $\beta$-OH (mm$^{-1}$) | (0.25) | (0.25) | (0.25) | (0.25) | (0.25) | (0.25) | (0.30) | (0.05) |
| MgO + CaO + SrO + BaO | 19.1 | 19.1 | 19.1 | 19.3 | 19.1 | 20.0 | 19.1 | 19.1 |
| MgO/(MgO + CaO + SrO + BaO) | 0.63 | 0.60 | 0.63 | 0.59 | 0.63 | 0.67 | 0.63 | 0.63 |
| (MgO + CaO)/((SrO) + BaO) | 18.1 | 18.1 | 46.8 | 37.5 | 46.8 | 14.4 | 46.8 | 46.8 |
| MgO/CaO | 2.0 | 1.7 | 1.8 | 1.6 | 1.8 | 2.6 | 1.8 | 1.8 |
| MgO + $Al_2O_3$ | 26.1 | 25.5 | 26.1 | 24.9 | 26.1 | 28.2 | 26.1 | 26.1 |
| Value of Formula (I) | 91.5 | 91.3 | 92.0 | 91.3 | 92.2 | 92.5 | 92.3 | 92.0 |
| Value of Formula (II) | 254 | 254 | 252 | 252 | 252 | 255 | 252 | 252 |
| Formula (I)/Formula (II) × 100 | 36.1 | 36.0 | 36.5 | 36.2 | 36.5 | 36.3 | 36.6 | 36.4 |
| Average coefficient of thermal expansion $\alpha$ ($\times 10^{-7}$/K.) | (37) | (37) | 36 | 37 | 36 | (38) | (37) | (37) |
| Density (g/cm$^3$) | 2.53 | 2.53 | 2.51 | 2.52 | 2.52 | (2.55) | (2.52) | (2.52) |
| Strain point (° C.) | (727) | (727) | 732 | 722 | 728 | (713) | (721) | (730) |
| Tg (° C.) | (785) | (785) | 790 | 782 | 787 | (767) | (778) | (787) |
| Young's modulus E (GPa) | 92 | 91 | 92 | 91 | 92 | (92) | (92) | (92) |
| $T_2$ [log$\eta$ = 2] (° C.) | (1630) | (1630) | 1623 | 1624 | 1622 | (1590) | (1625) | (1625) |
| $T_4$ [log$\eta$ = 4] (° C.) | (1290) | (1290) | 1282 | 1282 | 1281 | (1260) | (1285) | (1285) |
| Surface devitrification temperature $T_c$ (° C.) | (<1370) | (<1370) | 1300 | 1280 | 1320 | (<1340) | (<1330) | (<1330) |
| $T_C - T_4$ (° C.) | (<80) | (<80) | 18 | −2 | 39 | (<80) | (<45) | (<45) |
| log (surface devitrification viscosity $\eta_c$ (dPa · s)) | (≥3.4) | (≥3.4) | 3.9 | 4.0 | 3.7 | (≥3.4) | (≥3.9) | (≥3.9) |
| Specific elastic modulus (MN · m/kg) | (36.2) | (36.0) | 36.6 | 36.1 | 36.5 | (36.0) | (36.5) | (36.5) |
| Photoelastic constant C (nm/MPa/cm) | (24.4) | (23.9) | (25.1) | (25.9) | (25.1) | (25.2) | (25.1) | (25.1) |
| $\alpha \cdot E \cdot C$ ($\times 10^{-7}$/K) | (8.2) | (8.1) | (8.4) | (8.8) | (8.3) | (8.7) | (8.4) | (8.4) |
| BHF haze | (○) | (○) | (○) | (○) | (○) | (○) | (○) | (○) |

TABLE 6

| (mol %) | Example 32 | Example 33 | Example 34 | Example 35 | Example 36 | Example 37 | Example 38 | Example 39 |
|---|---|---|---|---|---|---|---|---|
| $SiO_2$ | 66.0 | 65.7 | 65.2 | 62.1 | 63.4 | 62.8 | 63.7 | 64.8 |
| $Al_2O_3$ | 14.0 | 13.9 | 13.7 | 16.6 | 14.9 | 18.6 | 15.2 | 13.6 |
| $B_2O_3$ | 0.9 | 0.9 | 1.3 | 1.3 | 1.9 | 0.6 | 1.1 | 1.3 |
| MgO | 12.1 | 12.1 | 12.6 | 15.8 | 15.3 | 8.9 | 10.1 | 13.0 |
| CaO | 6.6 | 6.6 | 6.1 | 1.8 | 1.4 | 8.5 | 9.3 | 6.0 |
| SrO | 0.4 | 0.4 | 0.7 | 0.8 | 3.1 | 0.4 | 0.6 | 1.0 |
| BaO | 0 | 0 | 0 | 1.5 | 0 | 0 | 0 | 0 |

TABLE 6-continued

| (mol %) | Example 32 | Example 33 | Example 34 | Example 35 | Example 36 | Example 37 | Example 38 | Example 39 |
|---|---|---|---|---|---|---|---|---|
| $Li_2O$ | 0.05 | 0 | 0 | 0.03 | 0 | 0 | 0 | 0 |
| $Na_2O$ | 0 | 0.08 | 0.13 | 0.04 | 0.06 | 0.09 | 0.006 | 0.03 |
| $K_2O$ | 0 | 0 | 0 | 0.02 | 0.01 | 0.01 | 0.003 | 0 |
| $SnO_2$ | 0 | 0 | 0.3 | 0 | 0 | 0 | 0 | 0.3 |
| $ZrO_2$ | 0 | 0 | 0 | 0 | 0 | 0 | 0 | 0 |
| $Fe_2O_3$ | 0.015 | 0.012 | 0.014 | 0.007 | 0.002 | 0.016 | 0.005 | 0.012 |
| Cl | 0 | 0 | 0 | 0.31 | 0 | 0 | 0.27 | 0 |
| F | 0 | 0.3 | 0.02 | 0.03 | 0.01 | 0.08 | 0 | 0 |
| β-OH $(mm^{-1})$ | (0.45) | (0.20) | (0.33) | (0.21) | (0.26) | (0.45) | (0.05) | (0.12) |
| MgO + CaO + SrO + BaO | 19.1 | 19.0 | 19.4 | 19.9 | 19.8 | 17.8 | 20.0 | 20.0 |
| MgO/(MgO + CaO + SrO + BaO) | 0.63 | 0.63 | 0.65 | 0.79 | 0.77 | 0.50 | 0.51 | 0.65 |
| (MgO + CaO)/(SrO) + BaO) | 46.8 | 46.8 | 26.7 | 7.7 | 5.4 | 43.5 | 32.3 | 18.9 |
| MgO/CaO | 1.8 | 1.8 | 2.1 | 8.8 | 10.9 | 1.0 | 1.1 | 2.2 |
| MgO + $Al_2O_3$ | 26.1 | 26.0 | 26.3 | 32.4 | 30.2 | 27.5 | 25.3 | 26.6 |
| Value of Formula (I) | 92.0 | 93.0 | 93.1 | 94.4 | 92.7 | 93.8 | 92.3 | 92.9 |
| Value of Formula (II) | 252 | 252 | 253 | 259 | 257 | 256 | 255 | 254 |
| Formula (I)/Formula (II) × 100 | 36.4 | 36.8 | 36.9 | 36.4 | 36.0 | 36.7 | 36.2 | 36.6 |
| Average coefficient of thermal expansion α $(\times 10^{-7}/K.)$ | (37) | (37) | (37) | (37) | (37) | (36) | (39) | (38) |
| Density $(g/cm^3)$ | (2.52) | (2.52) | (2.53) | (2.58) | (2.56) | (2.56) | (2.55) | (2.54) |
| Strain point (° C.) | (723) | (719) | (714) | (726) | (712) | (739) | (725) | (718) |
| Tg (° C.) | (780) | (777) | (771) | (777) | (770) | (803) | (784) | (775) |
| Young's modulus E (GPa) | (92) | (92) | (92) | (93) | (92) | (94) | (92) | (92) |
| $T_2$ [logη = 2] (° C.) | (1625) | (1625) | (1615) | (1595) | 1590 | (1595) | (1590) | (1605) |
| $T_4$ [logη = 4] (° C.) | (1285) | (1285) | (1275) | (1265) | (1260) | (1285) | (1265) | (1270) |
| Surface devitrification temperature $T_c$ (° C.) | (<1330) | (<1330) | (<1355) | (<1345) | (<1340) | (<1365) | (<1345) | (<1350) |
| $T_C - T_4$ (° C.) | (<45) | (<45) | (<80) | (<80) | (<80) | (<80) | (<80) | (<80) |
| log (surface devitrification viscosity $η_c$ (dPa · s)) | (≥3.9) | (≥3.9) | (≥3.4) | (≥3.4) | (≥3.4) | (≥3.4) | (≥3.4) | (≥3.4) |
| Specific elastic modulus (MN · m/kg) | (36.5) | (36.5) | (36.3) | (36.1) | (36.0) | (36.7) | (36.1) | (36.2) |
| Photoelastic constant C (nm/MPa/cm) | (25.1) | (25.1) | (25.4) | (23.6) | (24.1) | (21.2) | (24.3) | (25.4) |
| α · E · C $(\times 10^{-7}/K)$ | (8.4) | (8.4) | (8.6) | (8.2) | (8.2) | (7.2) | (8.7) | (8.8) |
| BIIF haze | (○) | (○) | (○) | (○) | (○) | (○) | (○) | (○) |

35

TABLE 7

| (mol %) | Example 40 | Example 41 | Example 42 | Example 43 | Example 44 | Example 45 | Example 46 | Example 47 |
|---|---|---|---|---|---|---|---|---|
| $SiO_2$ | 67.8 | 62.5 | 65.0 | 65.5 | 66.6 | 64.4 | 65.9 | 65.7 |
| $Al_2O_3$ | 13.0 | 19.0 | 13.4 | 14.0 | 14.4 | 16.7 | 14.0 | 13.1 |
| $B_2O_3$ | 1.0 | 4.5 | 1.2 | 0.8 | 0.9 | 1.6 | 1.0 | 0.9 |
| MgO | 12.5 | 11.5 | 12.6 | 12.2 | 11.3 | 10.9 | 12.0 | 12.1 |
| CaO | 4.5 | 1.3 | 6.6 | 6.5 | 5.4 | 5.1 | 6.0 | 6.6 |
| SrO | 1.0 | 1.0 | 0.6 | 0.5 | 1.3 | 1.3 | 1.0 | 0.4 |
| BaO | 0 | 0 | 0 | 0 | 0 | 0 | 0 | 0 |
| $Li_2O$ | 0 | 0 | 0 | 0.01 | 0 | 0 | 0.08 | 0 |
| $Na_2O$ | 0.01 | 0.02 | 0.05 | 0.04 | 0.08 | 0.02 | 0.06 | 0.07 |
| $K_2O$ | 0 | 0 | 0 | 0.01 | 0 | 0 | 0 | 0 |
| $SnO_2$ | 0.2 | 0.2 | 0 | 0 | 0 | 0 | 0 | 0 |
| $ZrO_2$ | 0 | 0 | 0 | 0.4 | 0 | 0 | 0 | 1.1 |
| $Fe_2O_3$ | 0.009 | 0.017 | 0.009 | 0.013 | 0.011 | 0.041 | 0.034 | 0.006 |
| Cl | 0.11 | 0 | 0.18 | 0 | 0 | 0.22 | 0 | 0 |
| F | 0 | 0 | 0.6 | 0.03 | 0.02 | 0 | 0 | 0.05 |
| β-OH $(mm^{-1})$ | (0.25) | (0.30) | (0.12) | (0.39) | (0.20) | (0.18) | (0.14) | (0.31) |
| MgO + CaO + SrO + BaO | 18.0 | 13.8 | 19.8 | 19.2 | 18.0 | 17.3 | 19.0 | 19.1 |
| MgO/(MgO + CaO + SrO + BaO) | 0.69 | 0.83 | 0.64 | 0.64 | 0.63 | 0.63 | 0.63 | 0.63 |
| (MgO + CaO)/(SrO) + BaO) | 17.0 | 12.8 | 32.0 | 37.4 | 12.8 | 12.3 | 18.0 | 46.8 |
| MgO/CaO | 2.8 | 8.8 | 1.9 | 1.9 | 2.1 | 2.1 | 2.0 | 1.8 |
| MgO + $Al_2O_3$ | 25.5 | 30.5 | 26.0 | 26.2 | 25.7 | 27.6 | 26.0 | 25.2 |
| Value of Formula (I) | 91.0 | 91.5 | 93.8 | 93.5 | 91.1 | 91.7 | 91.8 | 95.1 |
| Value of Formula (II) | 251 | 249 | 253 | 253 | 253 | 254 | 253 | 252 |
| Formula (I)/Formula (II) × 100 | 36.2 | 36.8 | 37.1 | 37.0 | 36.0 | 36.1 | 36.3 | 37.8 |
| Average coefficient of thermal expansion α $(\times 10^{-7}/K.)$ | (35) | (30) | (38) | (37) | (36) | (35) | (37) | (37) |
| Density $(g/cm^3)$ | (2.51) | (2.50) | (2.53) | (2.53) | (2.53) | (2.54) | (2.53) | (2.52) |
| Strain point (° C.) | (729) | (739) | (707) | (722) | (731) | (738) | (724) | (719) |
| Tg (° C.) | (786) | (800) | (764) | (780) | (789) | (799) | (782) | (776) |
| Young's modulus E (GPa) | (91) | (90) | (92) | (92) | (91) | (92) | (92) | (92) |
| $T_2$ [logη = 2] (° C.) | (1660) | (1595) | (1610) | (1620) | (1645) | (1615) | (1625) | (1630) |

TABLE 7-continued

| (mol %) | Example 40 | Example 41 | Example 42 | Example 43 | Example 44 | Example 45 | Example 46 | Example 47 |
|---|---|---|---|---|---|---|---|---|
| $T_4$ [$\log\eta$ = 4] (° C.) | (1305) | (1285) | (1275) | (1285) | (1300) | (1290) | (1285) | (1285) |
| Surface devitrification temperature $T_c$ (° C.) | (<1385) | (<1365) | (<1355) | (<1365) | (<1380) | (<1370) | (<1365) | (<1365) |
| $T_C$ – $T_4$ (° C.) | (<80) | (<80) | (<80) | (<80) | (<80) | (<80) | (<80) | (<80) |
| log (surface devitrification viscosity $\eta_c$ (dPa · s)) | (≥3.4) | (≥3.4) | (≥3.4) | (≥3.4) | (≥3.4) | (≥3.4) | (≥3.4) | (≥3.4) |
| Specific elastic modulus (MN · m/kg) | (36.1) | (36.1) | (36.3) | (36.5) | (36.0) | (36.2) | (36.2) | (36.4) |
| Photoelastic constant C (nm/MPa/cm) | (26.1) | (22.6) | (25.6) | (24.9) | (25.0) | (23.2) | (25.2) | (25.7) |
| $\alpha \cdot E \cdot C$ (×10$^{-7}$/K) | (8.3) | (6.1) | (8.8) | (8.4) | (8.1) | (7.5) | (8.5) | (8.7) |
| BIIF haze | (○) | (○) | (○) | (○) | (○) | (○) | (○) | (○) |

TABLE 8

| (mol %) | Example 48 | Example 49 | Example 50 | Example 51 | Example 52 | Example 53 | Example 54 | Example 55 |
|---|---|---|---|---|---|---|---|---|
| $SiO_2$ | 70.0 | 64.0 | 63.4 | 64.2 | 64.0 | 61.3 | 63.8 | 65.0 |
| $Al_2O_3$ | 12.0 | 17.0 | 15.4 | 14.8 | 15.5 | 17.6 | 15.1 | 14.9 |
| $B_2O_3$ | 1.2 | 3.1 | 2.8 | 2.4 | 1.1 | 1.3 | 1.1 | 1.3 |
| MgO | 14.0 | 11.4 | 13.4 | 14.1 | 15.7 | 16.7 | 15.7 | 14.8 |
| CaO | 2.3 | 3.5 | 3.1 | 3.6 | 2.4 | 0.4 | 1.9 | 2.0 |
| SrO | 0.5 | 1.0 | 1.8 | 0.9 | 1.0 | 0.3 | 0.9 | 1.0 |
| BaO | 0 | 0 | 0 | 0 | 0.2 | 2.2 | 1.3 | 0.9 |
| $Li_2O$ | 0 | 0 | 0 | 0 | 0 | 0 | 0 | 0 |
| $Na_2O$ | 0.06 | 0.04 | 0.06 | 0.03 | 0.03 | 0.08 | 0.06 | 0.03 |
| $K_2O$ | 0 | 0 | 0 | 0 | 0 | 0 | 0 | 0 |
| $SnO_2$ | 0 | 0 | 0 | 0 | 0.1 | 0.2 | 0.1 | 0.2 |
| $ZrO_2$ | 0 | 0 | 0 | 0 | 0 | 0 | 0 | 0 |
| $Fe_2O_3$ | 0.031 | 0.024 | 0.026 | 0.015 | 0.009 | 0.014 | 0.026 | 0.004 |
| Cl | 0 | 0 | 0 | 0 | 0.34 | 0 | 0 | 0 |
| F | 0 | 0 | 0 | 0 | 0 | 0 | 0 | 0 |
| β-OH (mm$^{-1}$) | (0.21) | (0.33) | (0.35) | (0.21) | (0.15) | (0.35) | (0.21) | (0.24) |
| MgO + CaO + SrO + BaO | 16.8 | 15.9 | 18.3 | 18.6 | 19.3 | 19.6 | 19.8 | 18.7 |
| MgO/(MgO + CaO + SrO + BaO) | 0.83 | 0.72 | 0.73 | 0.76 | 0.81 | 0.85 | 0.79 | 0.79 |
| (MgO + CaO)/(SrO) + BaO) | 32.6 | 14.9 | 9.2 | 19.6 | 15.1 | 6.8 | 18.0 | 8.8 |
| MgO/CaO | 6.1 | 3.3 | 4.3 | 3.9 | 6.6 | 41.8 | 8.3 | 7.4 |
| MgO + $Al_2O_3$ | 26.0 | 28.4 | 28.8 | 28.9 | 31.2 | 34.3 | 30.8 | 29.7 |
| Value of Formula (I) | 90.1 | 91.1 | 91.8 | 92.3 | 94.1 | 94.8 | 93.2 | 92.2 |
| Value of Formula (II) | 248 | 251 | 253 | 252 | 255 | 261 | 258 | 255 |
| Formula (I)/Formula (II) × 100 | 36.4 | 36.3 | 36.2 | 36.7 | 37.0 | 36.4 | 36.2 | 36.1 |
| Average coefficient of thermal expansion α (×10$^{-7}$/K.) | (32) | (33) | (36) | (35) | (35) | (37 | (37) | (36) |
| Density (g/cm$^3$) | (2.48) | (2.51) | (2.53) | (2.52) | (2.54) | (2.60) | (2.57) | (2.55) |
| Strain point (° C.) | (733) | (731) | (714) | (720) | (732) | (730) | (726) | (729) |
| Tg (° C.) | (788) | (791) | (771) | (778) | (791) | (778) | (776) | (782) |
| Young's modulus E (GPa) | (90) | (91) | (91) | (92) | (94) | (93) | (92) | (92) |
| $T_2$ [$\log\eta$ = 2] (° C.) | (1690) | (1609) | (1591) | (1598) | (1601) | (1595) | (1615) | (1630) |
| $T_4$ [$\log\eta$ = 4] (° C.) | (1325) | (1285) | (1263) | (1267) | (1272) | (1266) | (1275) | (1288) |
| Surface devitrification temperature $T_c$ (° C.) | (<1405) | (<1365) | (<1343) | (<1347) | (<1352) | (<1346) | (<1355) | (<1368) |
| $T_C$ – $T_4$ (° C.) | (<80) | (<80) | (<80) | (<80) | (<80) | (<80) | <80) | (<80) |
| log (surface devitrification viscosity $\eta_c$ (dPa · s)) | (≥3.4) | (≥3.4) | (≥3.4) | (≥3.4) | (≥3.4) | (≥3.4) | (≥3.4) | (≥3.4) |
| Specific elastic modulus (MN · m/kg) | (36.5) | (36.1) | (36.0) | (36.5) | (37.1) | (36.0) | (36.0) | (36.0) |
| Photoelastic constant C (nm/MPa/cm) | (27.0) | (23.7) | (24.5) | (24.7) | (23.3) | (23.2) | (24.7) | (24.9) |
| $\alpha \cdot E \cdot C$ (×10$^{-7}$/K) | (7.9) | (7.0) | (7.9) | (8.0) | (7.7) | (8.0) | (8.5) | (8.2) |
| BIIF haze | (○) | (○) | (○) | (○) | (○) | (○) | (○) | (○) |

In Examples 1 to 14 and 24 to 55 which had MgO+CaO+SrO+BaO of 20% or lower, MgO/CaO of 1 or higher, MgO/(MgO+CaO+SrO+BaO) of 0.5 or higher, MgO+$Al_2O_3$ of 24% or higher and 38% or lower, and the value of Formula (I) of 90 or higher and 100 or lower, the strain point was 700° C. or higher and 740° C. or lower, the density was 2.6 g/cm$^3$ or lower, the Young's modulus E was 90 GPa or higher and 100 GPa or lower, the average coefficient of thermal expansion a at 50° C. to 350° C. was 30×10$^{-7}$/K or higher and 39×10$^{-7}$/K or lower, the temperature $T_2$ at which the glass viscosity reached 10$^2$ dPa·s was 1590° C. or higher and 1690° C. or lower, the temperature $T_4$ at which the glass viscosity reached 10$^4$ dPa·s was 1350° C. or lower, the difference ($T_c$–$T_4$) between the glass surface devitrification temperature ($T_c$) and $T_4$ was lower than 80° C., and the specific elastic modulus was 36 MN·m/kg or higher. As described above, when the specific elastic modulus is 36 MN·m/kg or higher, the deflection by its own weight becomes small.

In Example 15 which had the value of Formula (I) of lower than 90, the Young's modulus E was low and lower than 90 GPa, and the specific elastic modulus was low and lower than 36 MN·m/kg.

In Example 16 which had MgO/(MgO+CaO+SrO+BaO) of lower than 0.5, MgO+Al$_2$O$_3$ of lower than 24%, and the value of Formula (I) of lower than 90, the average coefficient of thermal expansion a at 50° C. to 350° C. was high and higher than 39×10$^{-7}$/K, the Young's modulus E was low and lower than 90 GPa, and the specific elastic modulus was low and lower than 36 MN·m/kg.

In Example 17 which did not include B$_2$O$_3$ and SrO and had MgO+CaO+SrO+BaO of higher than 20%, the strain point was high and higher than 740° C., and the temperature T$_2$ at which the glass viscosity reached 10$^2$ dPa·s was low and lower than 1590° C.

In Example 18 which did not include B$_2$O$_3$ and SrO, had a content of Al$_2$O$_3$ of lower than 12%, and had MgO+CaO+SrO+BaO of higher than 20%, the glass surface devitrification temperature (T$_c$) was (T$_4$+80)° C. or higher.

In Example 19 which had MgO+CaO+SrO+BaO of higher than 20% and MgO+Al$_2$O$_3$ of lower than 24%, the average coefficient of thermal expansion a at 0° C. to 350° C. was high and higher than 39×10$^{-7}$/K, and the specific elastic modulus was low and lower than 36 MN·m/kg.

In Example 20 which had the content of B$_2$O$_3$ of lower than 0.3%, the Young's modulus E was low and lower than 90 GPa, and the specific elastic modulus was low and lower than 36 MN·m/kg.

In Example 21 which had MgO+CaO+SrO+BaO of higher than 20%, the average coefficient of thermal expansion a at 0° C. to 350° C. was high and higher than 39×10$^{-7}$/K, and the temperature T$_2$ at which the glass viscosity reached 10$^2$ dPa·s was low and lower than 1590° C.

In Example 22 which had MgO+CaO+SrO+BaO of higher than 20%, the density was high and higher than 2.6 g/cm$^3$, and the Young's modulus E was low and lower than 90 GPa.

In Example 23 which had MgO+CaO+SrO+BaO of higher than 20%, MgO/CaO of lower than 1, MgO/(MgO+CaO+SrO+BaO) of lower than 0.5, and MgO+Al$_2$O$_3$ of lower than 24%, the average coefficient of thermal expansion a at 0° C. to 350° C. was high and higher than 39×10$^{-7}$/K.

Although the present invention has been described in detail with reference to specific aspects, it is apparent to those skilled in the art that various changes and modifications can be made without departing from the spirit and scope of the present invention. The present application is based on a Japanese patent application (No. 2021-145677) filed on Sep. 7, 2021, the entire contents of which are incorporated herein by reference. In addition, all references cited here are entirely incorporated.

INDUSTRIAL APPLICABILITY

The alkali-free glass according to the present embodiment is preferably used for display panels, semiconductor devices, carrier substrates for manufacturing flexible devices, carrier substrates for manufacturing semiconductor devices, information recording media, planar antennas, light control laminates, vehicle window glasses, and acoustic diaphragms.

The invention claimed is:

1. An alkali-free glass having a strain point of 700° C. or higher and 740° C. or lower, a density of 2.6 g/cm$^3$ or lower, a Young's modulus of 90 GPa or higher and 100 GPa or lower, an average coefficient of thermal expansion at 50° C. to 350° C. of 30×10$^{-7}$/K or higher and 39×10$^{-7}$/K or lower, a temperature T$_2$ at which a glass viscosity reaches 10$^2$ dPa·s of 1590° C. or higher and 1690° C. or lower, a temperature T$_4$ at which the glass viscosity reaches 10$^4$ dPa·s of 1350° C. or lower, a glass surface devitrification temperature (T$_c$) of lower than (T$_4$+80)° C., and a specific elastic modulus of 36 MN·m/kg or higher, the alkali-free glass comprising:

as represented by mol % based on oxides,
SiO$_2$: 55% or higher and 80% or lower;
Al$_2$O$_3$: 12% or higher and 20% or lower;
B$_2$O$_3$: 0.3% or higher and 5% or lower;
MgO: 5% or higher and 18% or lower;
CaO: 0.1% or higher and 12% or lower;
SrO: 0.1% or higher and 8% or lower; and
BaO: 0% or higher and 6% or lower; wherein
MgO+CaO+SrO+BaO is 20% or lower,
MgO/CaO is 1 or higher,
MgO/(MgO+CaO+SrO+BaO) is 0.5 or higher,
MgO+Al$_2$O$_3$ is 24% or higher and 38% or lower, and
when Formula (I) is (−3.125×[SiO$_2$]−2.394×[Al$_2$O$_3$]−3.511×[B$_2$O$_3$]−2.167×[MgO]−2.608×[CaO]−3.161×[SrO]−3.583×[BaO]+3.795×10$^2$), a value of Formula (T) is 90 or higher and 100 or lower.

2. The alkali-free glass according to claim 1, wherein when Formula (II) is (0.213×[SiO$_2$]+1.006×[Al$_2$O$_3$]−0.493×[B$_2$O$_3$]+1.158×[MgO]+1.386×[CaO]+3.092×[SrO]+4.198×[BaO]+2.004×10$^2$), a value of Formula (I)/Formula (II)×100 is 36 or higher.

3. The alkali-free glass according to claim 1, wherein (MgO+CaO)/(SrO+BaO) is 8 or higher.

4. The alkali-free glass according to claim 1, wherein when an average coefficient of linear expansion at 50° C. to 350° C. is set as α, the Young's modulus is set as E, and a photoelastic constant is set as C, a product α·E·C is 9.2×10$^{-7}$/K or lower.

5. The alkali-free glass according to claim 1, having the photoelastic constant of 31 nm/MPa/cm or lower.

6. The alkali-free glass according to claim 1, having a glass transition point of 730° C. or higher and 850° C. or lower.

7. The alkali-free glass according to claim 1, having a glass surface devitrification viscosity of 10$^{3.4}$ dPa·s or higher.

8. The alkali-free glass according to claim 1, comprising: 0% to 1% of ZrO$_2$ as represented by mol % based on oxides.

9. The alkali-free glass according to claim 1, wherein a total amount of Li$_2$O, Na$_2$O, and K$_2$O is 0.2% or lower as represented by mol % based on oxides.

10. The alkali-free glass according to claim 1, comprising: 0% or higher and 0.5% or lower of SnO$_2$ as represented by mol % based on oxides.

11. The alkali-free glass according to claim 1, comprising: 0% or higher and 1% or lower of F as represented by mol %.

12. The alkali-free glass according to claim 1, having a β-OH value of the glass of 0.05 mm$^{-1}$ or higher and 0.6 mm$^{-1}$ or lower.

13. A glass sheet, wherein the glass sheet comprises the alkali-free glass according to claim 1, and has at least one side of 2400 mm or longer and a thickness of 1 mm or less.

14. A method for manufacturing the alkali-free glass according to claim 1, the method comprising: forming the alkali-free glass by a float process or a fusion process.

* * * * *